US012588132B2

(12) United States Patent
Jafari et al.

(10) Patent No.: US 12,588,132 B2
(45) Date of Patent: *Mar. 24, 2026

(54) X-RAY SOURCE WITH MULTIPLE GRIDS

(71) Applicants: VEC IMAGING GMBH & CO. KG, Erlangen (DE); Varex Imaging Corporation, Salt Lake City, UT (US)

(72) Inventors: Houman Jafari, Erlangen (DE); Bo Gao, Morrisville, NC (US); Vance Scott Robinson, South Jordan, UT (US); Colton B. Woodman, Magna, UT (US); Mohamed Zaza, Erlangen (DE)

(73) Assignees: VAREX IMAGING CORPORATION, Salt Lake City, UT (US); VEC IMAGING GMBH & CO. KG, Erlangen (DE)

( * ) Notice: Subject to any disclaimer, the term of this patent is extended or adjusted under 35 U.S.C. 154(b) by 371 days.

This patent is subject to a terminal disclaimer.

(21) Appl. No.: 18/346,190

(22) Filed: Jun. 30, 2023

(65) Prior Publication Data

US 2023/0363073 A1 Nov. 9, 2023

Related U.S. Application Data

(63) Continuation of application No. 16/920,265, filed on Jul. 2, 2020, now Pat. No. 11,778,717.

(30) Foreign Application Priority Data

Jun. 30, 2020 (EP) .................................... 20183282

(51) Int. Cl.
*H05G 1/08* (2006.01)
*H05G 1/30* (2006.01)

(52) U.S. Cl.
CPC ............... *H05G 1/085* (2013.01); *H05G 1/30* (2013.01)

(58) Field of Classification Search
CPC ...... H01J 35/153; H01J 35/066; H01J 35/065; H01J 2235/068; H01J 2235/062;
(Continued)

(56) References Cited

U.S. PATENT DOCUMENTS

| | | | |
|---|---|---|---|
| RE28,544 | E | 9/1975 | Stein |
| 4,203,036 | A | 5/1980 | Tschunt |

(Continued)

FOREIGN PATENT DOCUMENTS

| | | |
|---|---|---|
| CN | 102543635 | 7/2012 |
| CN | 106783488 | 5/2017 |

(Continued)

OTHER PUBLICATIONS

Nagao et al., Dependence of emission characteristics of Spindt-type field emitters on cathode material panel, Applied Surface Science, vol. 146, Issues 1-4, May 1999, 182-186.

(Continued)

*Primary Examiner* — Irakli Kiknadze
(74) *Attorney, Agent, or Firm* — Dorsey & Whitney LLP

(57) ABSTRACT

Some embodiments include an x-ray source, comprising: an anode; a field emitter configured to generate an electron beam; a first grid configured to control field emission from the field emitter; a second grid disposed between the first grid and the anode; a third grid disposed between the first grid and the anode; and a middle electrode disposed between the first grid and the anode wherein the second grid is either disposed between the first grid and middle electrode or between the middle electrode and the anode; wherein the third grid is a mesh grid.

20 Claims, 17 Drawing Sheets

(58) Field of Classification Search

CPC ...... H01J 35/025; H01J 35/045; H01J 35/147; H01J 29/085; H01J 29/62; H01J 35/06; H01J 35/101; H01J 2201/304; H01J 35/12; H01J 35/02; H01J 35/116; H01J 3/021; H01J 35/14; H01J 2203/0224; H01J 2203/0236; H01J 2201/30469; H01J 2203/022; H01J 35/08; H01J 35/064; H01J 3/14; H01J 29/58; H01J 29/488; H01J 29/51; H01J 29/82; H01J 29/481; H01J 35/16; H01J 35/20; H01J 35/13; H01J 2235/086; H01J 2235/087; H01J 2235/081; H01J 1/00; H01J 35/112; H01J 2235/064; H01J 2235/02; H05G 1/30; H05G 1/085; H05G 1/02; H05G 1/06; H05G 1/52; H05G 1/32; H05G 1/00; H05G 1/025; G01N 23/043; A61B 6/035

USPC ........................ 378/119, 113, 121, 138, 145

See application file for complete search history.

(56) References Cited

U.S. PATENT DOCUMENTS 4,219,733 A 8/1980 Tschunt
4,274,005 A 6/1981 Yamamura et al.
4,347,624 A 8/1982 Tschunt
4,592,080 A 5/1986 Rauch et al.
4,606,061 A 8/1986 Ramamurti
4,788,705 A 11/1988 Anderson
4,819,256 A 4/1989 Annis et al.
4,821,305 A 4/1989 Anderson
4,857,799 A 8/1989 Spindt et al.
4,877,554 A 10/1989 Honma et al.
4,914,681 A 4/1990 Klingenbeck et al.
5,015,912 A 5/1991 Spindt et al.
5,022,062 A 6/1991 Annis
RE33,634 E 7/1991 Yanaki
5,125,012 A 6/1992 Schittenhelm
5,149,584 A 9/1992 Baker et al.
5,150,394 A 9/1992 Karellas
5,153,900 A 10/1992 Nomikos et al.
5,164,972 A 11/1992 Krumme
5,179,581 A 1/1993 Annis
5,179,583 A 1/1993 Oikawa
5,181,234 A 1/1993 Smith
5,191,600 A 3/1993 Vincent et al.
5,193,105 A 3/1993 Rand et al.
5,195,112 A 3/1993 Vincent et al.
5,200,985 A 4/1993 Miller
5,241,577 A 8/1993 Burke et al.
5,243,252 A 9/1993 Kaneko et al.
5,247,556 A 9/1993 Eckert et al.
5,268,955 A 12/1993 Burke et al.
5,274,690 A 12/1993 Burke et al.
5,291,538 A 3/1994 Burke et al.
5,305,363 A 4/1994 Burke et al.
5,313,511 A 5/1994 Annis et al.
5,378,408 A 1/1995 Carroll et al.
5,384,820 A 1/1995 Burke
5,413,866 A 5/1995 Baker et al.
5,438,605 A 8/1995 Burke et al.
5,458,784 A 10/1995 Baker et al.
5,465,284 A 11/1995 Karellas
5,475,729 A 12/1995 Mattson et al.
5,493,599 A 2/1996 Mattson
5,504,791 A 4/1996 Hell et al.
5,548,630 A 8/1996 Hell et al.
5,567,357 A 10/1996 Wakita
5,581,591 A 12/1996 Burke et al.
5,591,312 A 1/1997 Smalley
5,618,875 A 4/1997 Baker et al.
5,642,394 A 6/1997 Rothschild
5,644,612 A 7/1997 Moorman et al.
5,653,951 A 8/1997 Rodriguez et al.
5,726,524 A 3/1998 Debe
5,729,583 A 3/1998 Tang et al.
5,763,886 A 6/1998 Schulte
5,764,683 A 6/1998 Swift et al.
5,768,337 A 6/1998 Anderson
5,773,921 A 6/1998 Keesmann et al.
5,854,822 A 12/1998 Chornenky et al.
5,864,146 A 1/1999 Karellas
5,869,922 A 2/1999 Tolt
5,892,231 A 4/1999 Baylor et al.
5,977,697 A 11/1999 Jin et al.
5,995,586 A 11/1999 Jahnke
6,009,141 A 12/1999 Hell et al.
6,018,562 A 1/2000 Willson
6,019,656 A 2/2000 Park et al.
6,031,892 A 2/2000 Karellas
6,057,637 A 5/2000 Zettl et al.
6,074,893 A 6/2000 Nakata et al.
6,094,472 A 7/2000 Smith
6,097,138 A 8/2000 Nakamoto
6,118,852 A 9/2000 Rogers et al.
6,146,230 A 11/2000 Kim et al.
6,156,433 A 12/2000 Hatori et al.
6,181,765 B1 1/2001 Sribar et al.
6,195,411 B1 2/2001 Dinsmore
6,225,225 B1 5/2001 Goh et al.
6,236,709 B1 5/2001 Perry et al.
6,239,547 B1 5/2001 Uemura et al.
6,250,984 B1 6/2001 Jin et al.
6,252,925 B1 6/2001 Wang et al.
6,259,765 B1 7/2001 Baptist
6,277,318 B1 8/2001 Bower et al.
6,280,697 B1 8/2001 Zhou et al.
6,282,260 B1 8/2001 Grodzins
6,312,303 B1 11/2001 Yaniv et al.
6,320,933 B1 11/2001 Grodzins et al.
6,331,194 B1 12/2001 Sampayan et al.
6,333,444 B1 12/2001 Ellis et al.
6,333,968 B1 12/2001 Whitlock et al.
6,334,939 B1 1/2002 Zhou et al.
6,356,570 B1 3/2002 Alon et al.
6,359,383 B1 3/2002 Chuang et al.
6,379,745 B1 4/2002 Kydd et al.
6,385,292 B1 5/2002 Dunham et al.
6,409,567 B1 6/2002 Amey, Jr. et al.
6,422,450 B1 7/2002 Zhou et al.
6,424,695 B1 7/2002 Grodzins et al.
6,436,221 B1 8/2002 Chang et al.
6,440,761 B1 8/2002 Choi
6,445,767 B1 9/2002 Karellas
6,456,691 B2 9/2002 Takahashi et al.
6,473,487 B1 10/2002 Le
6,504,292 B1 1/2003 Choi et al.
6,514,395 B2 2/2003 Zhou et al.
6,542,580 B1 4/2003 Carver et al.
6,553,096 B1 4/2003 Zhou et al.
6,597,760 B2 7/2003 Beneke et al.
RE38,223 E 8/2003 Keesmann et al.
6,616,497 B1 9/2003 Choi et al.
6,630,772 B1 10/2003 Bower et al.
6,646,382 B2 11/2003 Tanabe
6,653,588 B1 11/2003 Gillard-Hickman
6,661,867 B2 12/2003 Mario et al.
6,661,875 B2 12/2003 Greenwald et al.
6,661,876 B2 12/2003 Turner et al.
6,664,722 B1 12/2003 Yaniv et al.
6,665,373 B1 12/2003 Kotowski et al.
6,674,837 B1 1/2004 Taskar et al.
6,717,174 B2 4/2004 Karellas
6,718,012 B2 4/2004 Ein-Gal
6,731,716 B2 5/2004 Mihara et al.
6,739,932 B2 5/2004 Yaniv et al.
6,741,025 B2 5/2004 Tuck et al.
6,760,407 B2 7/2004 Price et al.
6,763,083 B2 7/2004 Fernandez
6,768,534 B2 7/2004 Iwase et al.
RE38,561 E 8/2004 Keesmann et al.
6,785,360 B1 8/2004 Annis
6,787,122 B2 9/2004 Zhou

(56) References Cited

U.S. PATENT DOCUMENTS 6,798,127 B2 9/2004 Mao et al.
6,799,075 B1 9/2004 Chornenky et al.
6,806,629 B2 10/2004 Sung
6,807,248 B2 10/2004 Mihara et al.
6,809,465 B2 10/2004 Jin
6,812,426 B1 11/2004 Kotowski et al.
6,815,790 B2 11/2004 Bui et al.
6,839,403 B1 1/2005 Kotowski et al.
6,843,599 B2 1/2005 Le et al.
6,850,595 B2 2/2005 Zhou et al.
6,856,667 B2 2/2005 Ellengogen
6,858,521 B2 2/2005 Jin
6,859,518 B2 2/2005 Banchieri et al.
6,864,162 B2 3/2005 Jin
6,876,724 B2 4/2005 Zhou et al.
6,912,268 B2 6/2005 Price et al.
6,928,141 B2 8/2005 Carver et al.
6,937,689 B2 8/2005 Zhao et al.
6,943,507 B2 9/2005 Winkler et al.
6,947,522 B2 9/2005 Wilson et al.
6,949,873 B2 9/2005 Sung
6,950,495 B2 9/2005 Nelson et al.
6,965,199 B2 11/2005 Stoner et al.
6,968,034 B2 11/2005 Ellengogen
6,969,536 B1 11/2005 Tuck et al.
6,969,690 B2 11/2005 Zhou et al.
6,975,703 B2 12/2005 Wilson et al.
6,980,627 B2 12/2005 Qiu et al.
7,012,266 B2 3/2006 Jin
7,014,743 B2 3/2006 Zhou et al.
7,016,459 B2 3/2006 Ellenbogen et al.
7,016,461 B2 3/2006 Rotondo et al.
7,016,471 B2 3/2006 Kindlein
7,020,242 B2 3/2006 Ellenbogen
7,027,560 B2 4/2006 Kindlein
7,039,154 B1 5/2006 Ellenbogen et al.
7,049,814 B2 5/2006 Mann
7,065,175 B2 6/2006 Green
7,068,749 B2 6/2006 Kollegal et al.
7,072,436 B2 7/2006 Pelc
7,072,440 B2 7/2006 Mario et al.
7,082,182 B2 7/2006 Zhou et al.
7,085,351 B2 8/2006 Lu et al.
7,085,352 B2 8/2006 Dunham
7,092,482 B2 8/2006 Besson
7,092,485 B2 8/2006 Kravis
7,099,434 B2 8/2006 Adams et al.
7,103,137 B2 9/2006 Seppi et al.
7,110,493 B1 9/2006 Kotowski et al.
7,123,681 B2 10/2006 Ellenbogen et al.
7,123,689 B1 10/2006 Wilson
7,125,308 B2 10/2006 Fink
7,129,513 B2 10/2006 Zhou et al.
7,137,860 B2 11/2006 Ahn et al.
7,142,629 B2 11/2006 Edie et al.
7,145,981 B2 12/2006 Pelc
7,145,988 B2 12/2006 Price et al.
7,147,894 B2 12/2006 Zhou et al.
7,154,992 B2 12/2006 Schuster
7,161,285 B2 1/2007 Okamoto et al.
7,164,747 B2 1/2007 Ellenbogen et al.
7,177,390 B2 2/2007 Martin et al.
7,177,391 B2 2/2007 Chapin et al.
7,180,981 B2 2/2007 Wang
7,183,963 B2 2/2007 Lee et al.
7,185,828 B2 3/2007 Igashira et al.
7,187,755 B2 3/2007 Dunham et al.
7,192,031 B2 3/2007 Dunham et al.
7,195,938 B2 3/2007 Yaniv et al.
7,197,116 B2 3/2007 Dunham et al.
7,203,269 B2 4/2007 Huber et al.
7,206,379 B2 4/2007 Lemaitre
7,215,740 B2 5/2007 Fukushima et al.
7,215,741 B2 5/2007 Ukita
7,218,700 B2 5/2007 Huber et al.
7,218,704 B1 5/2007 Adams et al.
7,218,707 B2 5/2007 Holm
7,220,971 B1 5/2007 Chang et al.
7,224,765 B2 5/2007 Ellenbogen
7,227,923 B2 6/2007 Edic et al.
7,227,924 B2 6/2007 Zhou et al.
7,233,101 B2 6/2007 Jin
7,233,644 B1 6/2007 Bendahan et al.
7,235,912 B2 6/2007 Sung
7,244,063 B2 7/2007 Eberhard et al.
7,245,692 B2 7/2007 Lu et al.
7,245,755 B1 7/2007 Pan et al.
7,252,749 B2 8/2007 Zhou et al.
7,255,757 B2 8/2007 Subramanian et al.
7,257,189 B2 8/2007 Modica et al.
7,261,466 B2 8/2007 Bhatt et al.
7,274,768 B2 9/2007 Green
7,276,844 B2 10/2007 Bouchard et al.
7,279,686 B2 10/2007 Schneiker
7,280,631 B2 10/2007 Man et al.
7,283,609 B2 10/2007 Possin et al.
7,294,248 B2 11/2007 Gao
7,295,651 B2 11/2007 Delgado et al.
7,317,278 B2 1/2008 Busta
7,319,733 B2 1/2008 Price et al.
7,319,734 B2 1/2008 Besson et al.
7,319,735 B2 1/2008 Defreitas et al.
7,319,736 B2 1/2008 Rotondo et al.
7,321,653 B2 1/2008 Hockersmith et al.
7,322,745 B2 1/2008 Agrawal et al.
7,324,627 B2 1/2008 Harding
7,324,629 B2 1/2008 Fukushima et al.
7,326,328 B2 2/2008 Hudspeth et al.
7,327,826 B2 2/2008 Hanke et al.
7,327,829 B2 2/2008 Chidester
7,327,830 B2 2/2008 Zhang et al.
7,330,531 B1 2/2008 Karellas
7,330,532 B2 2/2008 Winsor
7,330,533 B2 2/2008 Sampayon
7,330,535 B2 2/2008 Arenson et al.
7,330,832 B1 2/2008 Gray et al.
7,332,416 B2 2/2008 Bristol et al.
7,332,736 B2 2/2008 Jin
7,333,587 B2 2/2008 Man et al.
7,333,592 B2 2/2008 Nonoguchi et al.
7,336,769 B2 2/2008 Arenson et al.
7,338,487 B2 3/2008 Chornenky et al.
7,340,029 B2 3/2008 Popescu
7,342,233 B2 3/2008 Danielsson et al.
7,343,002 B1 3/2008 Lee et al.
7,346,146 B2 3/2008 Rütten et al.
7,346,147 B2 3/2008 Kirk et al.
7,346,148 B2 3/2008 Ukita
7,348,621 B2 3/2008 Moore
7,349,525 B2 3/2008 Morton et al.
7,352,841 B2 4/2008 Ellenbogen et al.
7,352,846 B2 4/2008 Kuribayashi et al.
7,352,887 B2 4/2008 Besson
7,355,330 B2 4/2008 Burden et al.
7,356,113 B2 4/2008 Wu et al.
7,356,122 B2 4/2008 Raber et al.
7,358,658 B2 4/2008 Sung
7,359,479 B2 4/2008 Oikawa et al.
7,359,484 B2 4/2008 Qiu et al.
7,359,485 B2 4/2008 Ohsawa
7,359,486 B2 4/2008 Subraya et al.
7,359,487 B1 4/2008 Newcome
7,362,847 B2 4/2008 Bijjani
7,366,279 B2 4/2008 Edic et al.
7,366,280 B2 4/2008 Lounsberry
7,366,283 B2 4/2008 Carlson et al.
7,369,640 B2 5/2008 Seppi et al.
7,369,643 B2 5/2008 Kotowski et al.
7,382,857 B2 6/2008 Engel
7,382,862 B2 6/2008 Bard et al.
7,382,864 B2 6/2008 Hebert et al.
7,386,095 B2 6/2008 Okada et al.
7,388,940 B1 6/2008 Man et al.
7,388,944 B2 6/2008 Hempel et al.

(56) References Cited

U.S. PATENT DOCUMENTS

| | | | | |
|---|---|---|---|---|
| 7,394,923 | B2 | 7/2008 | Zou et al. | |
| 7,403,590 | B2 | 7/2008 | Possin et al. | |
| 7,403,595 | B2 | 7/2008 | Kim et al. | |
| 7,406,156 | B2 | 7/2008 | Lenz | |
| 7,409,039 | B2 | 8/2008 | Banchieri et al. | |
| 7,409,043 | B1 | 8/2008 | Dunham et al. | |
| 7,418,077 | B2 | 8/2008 | Gray | |
| 7,424,095 | B2 | 9/2008 | Mildner et al. | |
| 7,428,297 | B2 | 9/2008 | Eilbert | |
| 7,428,298 | B2 | 9/2008 | Bard et al. | |
| 7,429,371 | B2 | 9/2008 | Diner et al. | |
| 7,431,500 | B2 | 10/2008 | Deych et al. | |
| 7,440,537 | B2 | 10/2008 | Ellenbogen et al. | |
| 7,440,543 | B2 | 10/2008 | Morton | |
| 7,440,544 | B2 | 10/2008 | Scheinman et al. | |
| 7,443,949 | B2 | 10/2008 | Defreitas et al. | |
| 7,444,011 | B2 | 10/2008 | Pan et al. | |
| 7,446,474 | B2 | 11/2008 | Moldonado et al. | |
| 7,447,298 | B2 | 11/2008 | Busta et al. | |
| 7,449,081 | B2 | 11/2008 | Bouchard et al. | |
| 7,449,082 | B2 | 11/2008 | Roach | |
| 7,455,757 | B2 | 11/2008 | Oh et al. | |
| 7,460,647 | B2 | 12/2008 | Weiss et al. | |
| 7,463,721 | B2 | 12/2008 | Harding et al. | |
| 7,466,072 | B2 | 12/2008 | Nam et al. | |
| 7,469,040 | B2 | 12/2008 | Holm et al. | |
| 7,483,510 | B2 | 1/2009 | Carver et al. | |
| 7,486,772 | B2 | 2/2009 | Lu et al. | |
| 7,489,763 | B2 | 2/2009 | Lenz | |
| 7,492,868 | B2 | 2/2009 | Gorrell et al. | |
| 7,496,179 | B2 | 2/2009 | Freudenberger et al. | |
| 7,502,442 | B2 | 3/2009 | Hooper et al. | |
| 7,505,556 | B2 | 3/2009 | Chalmers et al. | |
| 7,505,557 | B2 | 3/2009 | Modica et al. | |
| 7,505,562 | B2 | 3/2009 | Dinca et al. | |
| 7,505,563 | B2 | 3/2009 | Morton et al. | |
| 7,508,122 | B2 | 3/2009 | Huber | |
| 7,508,910 | B2 | 3/2009 | Safai et al. | |
| 7,512,215 | B2 | 3/2009 | Morton et al. | |
| 7,515,688 | B2 | 4/2009 | Harding | |
| 7,517,149 | B2 | 4/2009 | Agrawal et al. | |
| 7,519,151 | B1 | 4/2009 | Shukla et al. | |
| 7,526,065 | B2 | 4/2009 | Hardesty | |
| 7,526,069 | B2 | 4/2009 | Matsumura et al. | |
| 7,529,344 | B2 | 5/2009 | Oreper | |
| 7,558,374 | B2 | 7/2009 | Lemaitre | |
| 7,561,666 | B2 | 7/2009 | Annis | |
| 7,564,938 | B2 | 7/2009 | Tesic et al. | |
| 7,564,939 | B2 | 7/2009 | Morton et al. | |
| 7,567,647 | B1 | 7/2009 | Maltz | |
| 7,579,077 | B2 | 8/2009 | Dubrow et al. | |
| 7,580,500 | B2 | 8/2009 | Forster et al. | |
| 7,583,791 | B2 | 9/2009 | Hockersmith et al. | |
| 7,606,348 | B2 | 10/2009 | Foland et al. | |
| 7,606,349 | B2 | 10/2009 | Oreper et al. | |
| 7,608,974 | B2 | 10/2009 | Sung | |
| 7,609,806 | B2 | 10/2009 | Defreitas et al. | |
| 7,609,807 | B2 | 10/2009 | Leue et al. | |
| 7,616,731 | B2 | 11/2009 | Pack et al. | |
| 7,618,300 | B2 | 11/2009 | Liu et al. | |
| 7,625,545 | B2 | 12/2009 | Nishi et al. | |
| 7,627,087 | B2 | 12/2009 | Zou et al. | |
| 7,634,047 | B2 | 12/2009 | Popescu et al. | |
| 7,639,775 | B2 | 12/2009 | DeMan et al. | |
| 7,660,391 | B2 | 2/2010 | Oreper et al. | |
| 7,664,222 | B2 | 2/2010 | Jabri et al. | |
| 7,664,230 | B2 | 2/2010 | Morton et al. | |
| 7,672,422 | B2 | 3/2010 | Seppi et al. | |
| 7,684,538 | B2 | 3/2010 | Morton et al. | |
| 7,702,068 | B2 | 4/2010 | Scheinman et al. | |
| 7,706,499 | B2 | 4/2010 | Pack et al. | |
| 7,706,508 | B2 | 4/2010 | Arenson et al. | |
| 7,724,868 | B2 | 5/2010 | Morton | |
| 7,731,810 | B2 | 6/2010 | Subramanian et al. | |
| 7,736,209 | B2 | 6/2010 | Mao et al. | |
| 7,742,563 | B2 | 6/2010 | Edic et al. | |
| 7,751,528 | B2 | 7/2010 | Zhou et al. | |
| 7,760,849 | B2 | 7/2010 | Zhang | |
| 7,771,117 | B2 | 8/2010 | Kim et al. | |
| 7,778,391 | B2 | 8/2010 | Fuerst et al. | |
| 7,803,574 | B2 | 9/2010 | Desai et al. | |
| 7,809,109 | B2 | 10/2010 | Mastronardi et al. | |
| 7,809,114 | B2 | 10/2010 | Zou et al. | |
| 7,826,589 | B2 | 11/2010 | Kotowski et al. | |
| 7,826,595 | B2 | 11/2010 | Liu et al. | |
| 7,831,012 | B2 | 11/2010 | Foland et al. | |
| 7,834,530 | B2 | 11/2010 | Manohara et al. | |
| 7,835,486 | B2 | 11/2010 | Basu et al. | |
| 7,850,874 | B2 | 12/2010 | Lu et al. | |
| 7,864,917 | B2 | 1/2011 | Ribbing et al. | |
| 7,864,924 | B2 | 1/2011 | Ziskin et al. | |
| 7,869,566 | B2 | 1/2011 | Edic et al. | |
| 7,875,469 | B2 | 1/2011 | Busta | |
| 7,876,879 | B2 | 1/2011 | Morton | |
| 7,885,375 | B2 | 2/2011 | Man et al. | |
| 7,887,689 | B2 | 2/2011 | Zhou et al. | |
| 7,899,156 | B2 | 3/2011 | Oreper et al. | |
| 7,902,736 | B2 | 3/2011 | Hudspeth et al. | |
| 7,903,781 | B2 | 3/2011 | Foland et al. | |
| 7,903,789 | B2 | 3/2011 | Morton et al. | |
| 7,924,975 | B2 | 4/2011 | Zhang et al. | |
| 7,929,663 | B2 | 4/2011 | Morton | |
| 7,936,858 | B2 | 5/2011 | Hashemi et al. | |
| 7,949,101 | B2 | 5/2011 | Morton | |
| 7,965,812 | B2 | 6/2011 | Hanke et al. | |
| 7,965,816 | B2 | 6/2011 | Kravis et al. | |
| 7,970,099 | B2 | 6/2011 | Fadler | |
| 7,972,616 | B2 | 7/2011 | Dubrow et al. | |
| 7,983,381 | B2 | 7/2011 | David et al. | |
| 8,002,958 | B2 | 8/2011 | Zhou et al. | |
| 8,005,191 | B2 | 8/2011 | Jaafar et al. | |
| 8,019,047 | B2 | 9/2011 | Birnbach | |
| 8,021,045 | B2 | 9/2011 | Foos et al. | |
| 8,026,674 | B2 | 9/2011 | Berk et al. | |
| 8,031,834 | B2 | 10/2011 | Ludwig et al. | |
| 8,059,783 | B2 | 11/2011 | Oreper et al. | |
| 8,066,967 | B2 | 11/2011 | Eberlein et al. | |
| 8,070,906 | B2 | 12/2011 | Bouchard et al. | |
| 8,094,781 | B1 | 1/2012 | Safai et al. | |
| 8,098,794 | B1 | 1/2012 | Fernandez | |
| 8,135,110 | B2 | 3/2012 | Morton | |
| 8,155,262 | B2 | 4/2012 | Zhou et al. | |
| 8,155,272 | B2 | 4/2012 | Eilbert et al. | |
| 8,304,595 | B2 | 11/2012 | Daniels et al. | |
| 8,319,002 | B2 | 11/2012 | Daniels et al. | |
| 8,340,250 | B2 * | 12/2012 | Lemaitre ................. | H01J 35/04<br>378/138 |
| 8,345,819 | B2 | 1/2013 | Mastronardi et al. | |
| 8,351,575 | B2 | 1/2013 | Vogtmeier | |
| 8,447,013 | B2 | 5/2013 | Sprenger et al. | |
| 8,488,737 | B2 | 7/2013 | Boese et al. | |
| 8,503,605 | B2 | 8/2013 | Morton et al. | |
| 8,529,798 | B2 | 9/2013 | Bouchard et al. | |
| 8,532,259 | B2 | 9/2013 | Shedlock et al. | |
| 8,654,919 | B2 | 2/2014 | Sabol et al. | |
| 8,692,230 | B2 | 4/2014 | Zhou et al. | |
| 8,724,872 | B1 | 5/2014 | Ziskin et al. | |
| 8,778,716 | B2 | 7/2014 | Zhou et al. | |
| 8,824,632 | B2 | 9/2014 | Mastronardi | |
| 8,956,637 | B2 | 2/2015 | Dubrow et al. | |
| 11,778,717 | B2 * | 10/2023 | Jafari .................... | H01J 35/065<br>378/113 |
| 2001/0009970 | A1 | 7/2001 | Chornenky et al. | |
| 2001/0025962 | A1 | 10/2001 | Nakamoto | |
| 2002/0006489 | A1 | 1/2002 | Goth et al. | |
| 2002/0063500 | A1 | 5/2002 | Keren | |
| 2002/0074932 | A1 | 6/2002 | Bouchard et al. | |
| 2002/0085674 | A1 | 7/2002 | Price et al. | |
| 2002/0189400 | A1 | 12/2002 | Kodas et al. | |
| 2003/0002627 | A1 | 1/2003 | Espinosa et al. | |
| 2003/0002628 | A1 | 1/2003 | Wilson et al. | |
| 2003/0023592 | A1 | 1/2003 | Modica et al. | |
| 2003/0092207 | A1 | 5/2003 | Yaniv et al. | |
| 2003/0210764 | A1 | 11/2003 | Tekletsadik et al. | |

(56) References Cited

U.S. PATENT DOCUMENTS

| | | | |
|---|---|---|---|
| 2004/0013597 | A1 | 1/2004 | Mao et al. |
| 2004/0018371 | A1 | 1/2004 | Mao |
| 2004/0025732 | A1 | 2/2004 | Tuck et al. |
| 2004/0036402 | A1 | 2/2004 | Keesmann et al. |
| 2004/0070326 | A1 | 4/2004 | Mao et al. |
| 2004/0191698 | A1 | 9/2004 | Yagi et al. |
| 2004/0198892 | A1 | 10/2004 | Busta et al. |
| 2004/0213378 | A1 | 10/2004 | Zhou et al. |
| 2004/0218714 | A1 | 11/2004 | Faust |
| 2004/0224081 | A1 | 11/2004 | Sheu et al. |
| 2004/0240616 | A1 | 12/2004 | Qiu et al. |
| 2004/0256975 | A1 | 12/2004 | Gao et al. |
| 2005/0001528 | A1 | 1/2005 | Mao et al. |
| 2005/0025280 | A1 | 2/2005 | Schulte |
| 2005/0038498 | A1 | 2/2005 | Dubrow et al. |
| 2005/0094769 | A1 | 5/2005 | Heismann et al. |
| 2005/0105685 | A1 | 5/2005 | Harding |
| 2005/0108926 | A1 | 5/2005 | Moy et al. |
| 2005/0112048 | A1 | 5/2005 | Tsakalakos et al. |
| 2005/0129178 | A1 | 6/2005 | Pettit |
| 2005/0129858 | A1 | 6/2005 | Jin et al. |
| 2005/0148174 | A1 | 7/2005 | Unger et al. |
| 2005/0157179 | A1 | 7/2005 | Cha et al. |
| 2005/0200261 | A1 | 9/2005 | Mao et al. |
| 2005/0225228 | A1 | 10/2005 | Burden et al. |
| 2005/0226364 | A1 | 10/2005 | Man et al. |
| 2005/0231091 | A1 | 10/2005 | Bouchard et al. |
| 2005/0232844 | A1 | 10/2005 | Diner et al. |
| 2005/0244991 | A1 | 11/2005 | Mao et al. |
| 2006/0018432 | A1 | 1/2006 | Zhou et al. |
| 2006/0041104 | A1 | 2/2006 | Ait-Haddou et al. |
| 2006/0049741 | A1 | 3/2006 | Bouchard et al. |
| 2006/0054866 | A1 | 3/2006 | Ait-Haddou et al. |
| 2006/0066202 | A1 | 3/2006 | Manohara et al. |
| 2006/0159916 | A1 | 7/2006 | Dubrow et al. |
| 2006/0163996 | A1 | 7/2006 | Tuck et al. |
| 2006/0204738 | A1 | 9/2006 | Dubrow et al. |
| 2006/0216412 | A1 | 9/2006 | Chen |
| 2006/0226763 | A1 | 10/2006 | Moon et al. |
| 2006/0246810 | A1 | 11/2006 | Lee et al. |
| 2006/0252163 | A1 | 11/2006 | Yaniv et al. |
| 2006/0274889 | A1 | 12/2006 | Lu et al. |
| 2007/0007142 | A1 | 1/2007 | Zhou et al. |
| 2007/0009081 | A1 | 1/2007 | Zhou et al. |
| 2007/0009088 | A1 | 1/2007 | Edic et al. |
| 2007/0014148 | A1 | 1/2007 | Zhou et al. |
| 2007/0018045 | A1 | 1/2007 | Callahan et al. |
| 2007/0030955 | A1 | 2/2007 | Eilbert et al. |
| 2007/0042667 | A1 | 2/2007 | Sung |
| 2007/0046166 | A1 | 3/2007 | Okada et al. |
| 2007/0086574 | A1 | 4/2007 | Lenz |
| 2007/0126312 | A1 | 6/2007 | Sung |
| 2007/0133747 | A1 | 6/2007 | Manak et al. |
| 2007/0160758 | A1 | 7/2007 | Roach |
| 2007/0189459 | A1 | 8/2007 | Eaton et al. |
| 2007/0247048 | A1 | 10/2007 | Zhang et al. |
| 2007/0247049 | A1 | 10/2007 | Li et al. |
| 2007/0257592 | A1 | 11/2007 | Li et al. |
| 2007/0284533 | A1 | 12/2007 | Green |
| 2008/0019485 | A1 | 1/2008 | Weiss et al. |
| 2008/0029145 | A1 | 2/2008 | Sung |
| 2008/0063140 | A1 | 3/2008 | Awad |
| 2008/0069420 | A1 | 3/2008 | Zhang et al. |
| 2008/0074026 | A1 | 3/2008 | Sakai et al. |
| 2008/0099339 | A1 | 5/2008 | Zhou et al. |
| 2008/0118030 | A1 | 5/2008 | Lee et al. |
| 2008/0130831 | A1 | 6/2008 | Rotondo et al. |
| 2008/0199626 | A1 | 8/2008 | Zhou et al. |
| 2008/0206448 | A1 | 8/2008 | Mao et al. |
| 2008/0232545 | A1 | 9/2008 | Wu et al. |
| 2008/0253521 | A1 | 10/2008 | Boyden et al. |
| 2008/0267354 | A1 | 10/2008 | Holm et al. |
| 2008/0299864 | A1 | 12/2008 | Bouchard et al. |
| 2009/0022264 | A1 | 1/2009 | Zhou et al. |
| 2009/0041198 | A1 | 2/2009 | Price et al. |
| 2009/0052615 | A1 | 2/2009 | Ribbing et al. |
| 2009/0104834 | A1 | 4/2009 | Bouchard et al. |
| 2009/0116617 | A1 | 5/2009 | Mastronardi et al. |
| 2009/0185661 | A1 | 7/2009 | Zou et al. |
| 2009/0245468 | A1 | 10/2009 | Zou et al. |
| 2009/0285353 | A1 | 11/2009 | Ellenbogen et al. |
| 2009/0316860 | A1 | 12/2009 | Okunuki et al. |
| 2010/0034450 | A1 | 2/2010 | Mertelmeier |
| 2010/0052511 | A1 | 3/2010 | Keesmann |
| 2010/0140160 | A1 | 6/2010 | Dubrow et al. |
| 2010/0140213 | A1 | 6/2010 | Mizukami et al. |
| 2010/0189223 | A1 | 7/2010 | Eaton et al. |
| 2010/0226479 | A1 | 9/2010 | Beyerlein et al. |
| 2010/0285972 | A1 | 11/2010 | Dubrow et al. |
| 2010/0322498 | A1 | 12/2010 | Wieczorek et al. |
| 2010/0329413 | A1 | 12/2010 | Zhou et al. |
| 2011/0002441 | A1 | 1/2011 | Vogtmeier et al. |
| 2011/0002442 | A1 | 1/2011 | Thran et al. |
| 2011/0007874 | A1 | 1/2011 | Vogtmeier |
| 2011/0044546 | A1 | 2/2011 | Pan et al. |
| 2011/0075802 | A1 | 3/2011 | Beckmann et al. |
| 2011/0075814 | A1 | 3/2011 | Boese et al. |
| 2011/0096903 | A1 | 4/2011 | Singh |
| 2011/0101302 | A1 | 5/2011 | Zhou et al. |
| 2011/0116603 | A1 | 5/2011 | Kim et al. |
| 2011/0142204 | A1 | 6/2011 | Zou et al. |
| 2011/0142316 | A1 | 6/2011 | Wang et al. |
| 2011/0170663 | A1 | 7/2011 | Boese et al. |
| 2011/0170757 | A1 | 7/2011 | Pan et al. |
| 2011/0211666 | A1 | 9/2011 | Ying et al. |
| 2011/0311019 | A1 | 12/2011 | Ribbing et al. |
| 2012/0033791 | A1 | 2/2012 | Mastronardi |
| 2012/0286692 | A1 | 11/2012 | Beckmann et al. |
| 2012/0288066 | A1 | 11/2012 | Kang et al. |
| 2012/0318987 | A1 | 12/2012 | Miyazaki et al. |
| 2013/0101090 | A1 | 4/2013 | Schubert et al. |
| 2013/0129046 | A1 | 5/2013 | Yamazaki et al. |
| 2013/0170611 | A1 | 7/2013 | Beckmann et al. |
| 2013/0195248 | A1 | 8/2013 | Rothschild et al. |
| 2013/0202089 | A1 | 8/2013 | Schubert et al. |
| 2013/0208857 | A1 | 8/2013 | Arodzero et al. |
| 2013/0313964 | A1 | 11/2013 | Iwai et al. |
| 2013/0336459 | A1 | 12/2013 | Choi et al. |
| 2013/0343520 | A1 | 12/2013 | Grodzins et al. |
| 2014/0098937 | A1 | 4/2014 | Bendahan |
| 2014/0112455 | A1 | 4/2014 | Matsuda |
| 2014/0133629 | A1 | 5/2014 | Morton |
| 2014/0362976 | A1 | 12/2014 | Matsumoto et al. |
| 2015/0078532 | A1 | 3/2015 | Tang et al. |
| 2017/0162359 | A1 | 6/2017 | Tang et al. |
| 2018/0158640 | A1 | 6/2018 | Choi et al. |
| 2019/0189384 | A1 | 6/2019 | Woodman et al. |
| 2019/0341218 | A1 | 11/2019 | Takahashi et al. |
| 2020/0170097 | A1 | 5/2020 | Tan et al. |
| 2020/0179009 | A1 | 6/2020 | Zhang et al. |

FOREIGN PATENT DOCUMENTS

| | | |
|---|---|---|
| EP | 1020888 | 7/2000 |
| EP | 2945181 | 11/2015 |
| JP | 2007265981 | 10/2007 |
| JP | 2009009942 | 1/2009 |
| JP | 2013245292 | 12/2013 |
| WO | 1994015350 | 7/1994 |
| WO | 1994015352 | 7/1994 |
| WO | 1994028571 | 12/1994 |
| WO | 1999031702 | 6/1999 |
| WO | 2001093292 | 12/2001 |
| WO | 2002041348 | 5/2002 |
| WO | 2003084865 | 10/2003 |
| WO | 2004049373 | 6/2004 |
| WO | 2004099068 | 11/2004 |
| WO | 2004102604 | 11/2004 |
| WO | 2006130630 | 12/2006 |

OTHER PUBLICATIONS

Zhang et al., Stationary scanning x-ray source based on carbon nanotube field emitters, Applied Physics Letters 86, 184104 (2005).

(56) References Cited

OTHER PUBLICATIONS

Zhang et al., A multi-beam X-ray imaging system based on carbon nanotube field emitters, Medical Imaging 2006: Physics of Medical Imaging, Proceedings of the SPIE—The International Society for Optical Engineering, vol. 6142, 614204-1 to 614204-8 (2006).
Sarrazin et al., Carbon-nanotube field emission X-ray tube for space exploration XRD/XRF instrument, International Centre for Diffraction Data 2004, Advances in X-ray Analysis, vol. 47 232-239.
Senda et al., New field-emission x-ray radiography system, Review of Scientific Instruments, vol. 75, No. 5, 1366-1368, May 2004.
Sugie et al., Carbon nanotubes as electron source in an x-ray tube, Applied Physics Letters vol. 78, No. 17, 2578-2580 (2001).
Qian et al., Design and characterization of a spatially distributed multibeam field emission x-ray source for stationary digital breast tomosynthesis, Med Phys. 36(10): 4389-4399 (Oct. 2009).
Chen et al., Theoretical Study of a 0.22 THz Backward Wave Oscillator Based on a Dual-Gridded, Carbon-Nanotube Cold Cathode, Appl. Sci. 2018, 8, 2462.
Zhu et al., Field emission properties of diamond and carbon nanotubes, Diamond and Related Materials, vol. 10, Issues 9-10, 1709-1713, Sep.-Oct. 2001.
Japanese Patent Application No. 2021-104291, Decision of Rejection dated Jan. 4, 2023 (with English translation).
JP2021-104291, Amendment dated Apr. 25, 2023 (with English translation).
JP2021-104291, Notice of Appeal dated Apr. 25, 2023 (with English translation).
JP2021-104291, Notice of Transfer of a case for reconsideration by examiners before appeal proceedings dated Jun. 29, 2023 (with English translation).
JP2021-104291, Reconsideration report by examiner before appeal dated Jul. 19, 2023 (with English translation).
JP2021-104291, Written statement dated Jul. 19, 2023 (with English translation).
JP2021-104291, Notice of termination of reconsideration by examiners before appeal proceedings dated Jul. 21, 2023 (with English translation).
EP Patent Application No. 20 183 282.1, Extended Search Report dated Mar. 25, 2022.
EP Patent Application No. 20 183 282.1, Response dated Oct. 4, 2022.

* cited by examiner

X-RAY SOURCE WITH MULTIPLE GRIDS

CROSS-REFERENCE TO RELATED APPLICATIONS

This application is a continuation of U.S. patent application Ser. No. 16/920,265, filed 2 Jul. 2020, now patented as U.S. Pat. No. 11,778,717, which claims priority to European Patent Application No. 20183282.1, filed 30 Jun. 2020, the entire disclosures of which are hereby incorporated by reference.

Arcing and ion back bombardment may occur in x-ray tubes. For example, an arc may form in a vacuum or dielectric of an x-ray tube. The arc may damage internal components of the x-ray tube such as a cathode. In addition, charged particles may be formed by the arc ionizing residual atoms in the vacuum enclosure and/or by atoms ionized by the electron beam. These charged particles may be accelerated towards the cathode, potentially causing damage.

DETAILED DESCRIPTION

Some embodiments relate to x-ray sources with multiple grids and, in particular, to x-ray sources with multiple mesh grids.

When electron beams generate x-rays, field emitters, such as nanotube emitters may be damaged by arcing and ion back bombardment events. Arcing is a common phenomena in x-ray tubes. Arcs may occur when the vacuum or some other dielectric material cannot maintain the high electric potential gradient. A very high energy pulse of charged particles (electrons and/or ions) temporarily bridges the vacuum or dielectric spacer. Once the high energy arc pulse initiates, all residual gas species in proximity are ionized where the large majority of ionized species become positively charged ions and are attracted to the negatively charged cathode including the nanotube (NT) emitters. NT emitters can be seriously damaged if they are exposed to these high-energy ion pulses.

Ion bombardment is another common phenomena in x-ray tubes. When the electron beam is ignited and passing through the vacuum gap to the anode it may ionize residual gas species in the tube or sputtered tungsten atoms from the target. Once ionized—generally with positive polarity, the ions are accelerated towards the cathode, including the NT emitters.

Embodiments described herein may reduce the effects of arcing and/or ion bombardment. One or more additional grids may intercept the arcs or ions and reduce a chance that a field emitter is damaged.

Figure 1A:
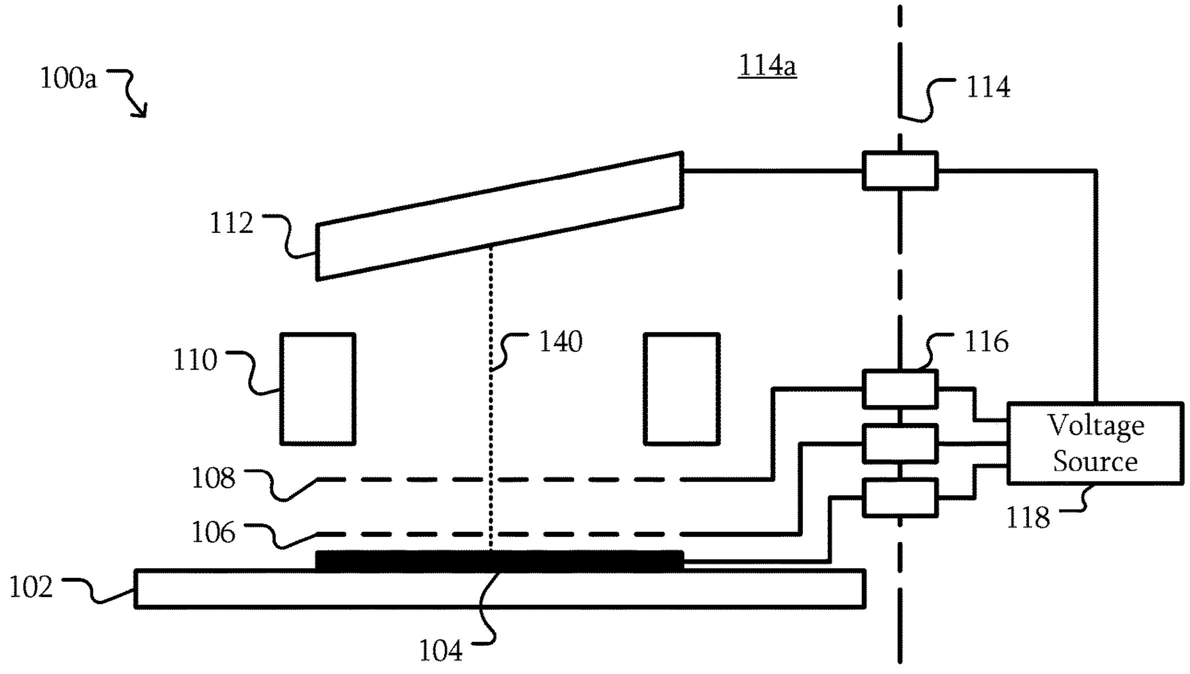
FIGS. 1A-1C are block diagrams of field emitter x-ray sources with multiple grids according to some embodiments.
Figure 1B:
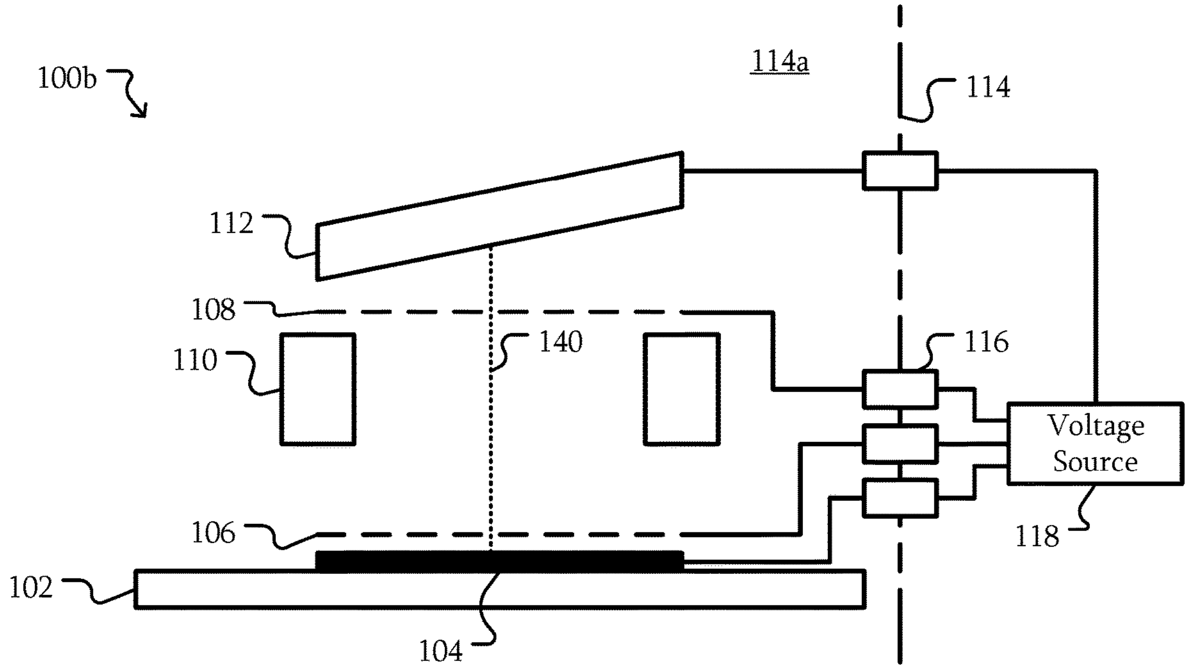
Figure 1C:
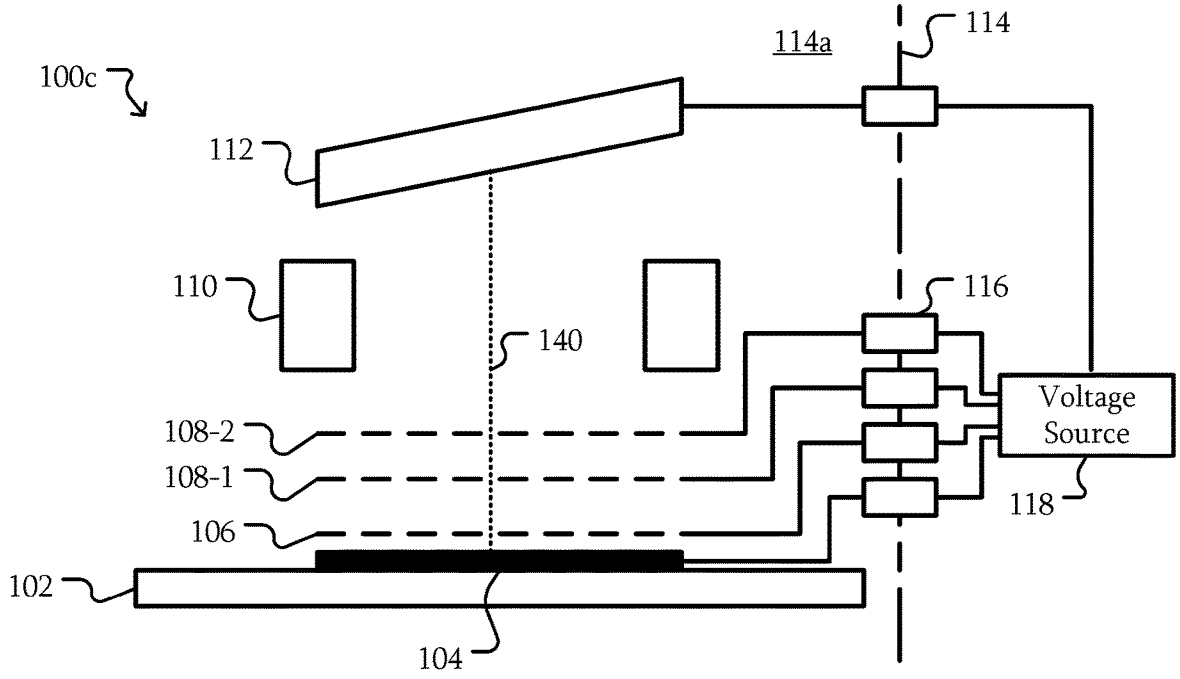

FIGS. 1A-1C are block diagrams of field emitter x-ray sources with multiple grids according to some embodiments. Referring to FIG. 1A, in some embodiments, an x-ray source 100*a* includes a substrate 102, a field emitter 104, a first grid 106, a second grid 108, a middle electrode 110, and an anode 112. In some embodiments, the substrate 102 is formed of an insulating material such as ceramic, glass, aluminum oxide ($Al_2O_3$), aluminum nitride (AlN), silicon oxide or quartz ($SiO_2$), or the like.

The field emitter 104 is disposed on the substrate 102. The field emitter 104 is configured to generate an electron beam 140. The field emitter 104 may include a variety of types of emitters. For example, the field emitter 104 may include a nanotube emitter, a nanowire emitter, a Spindt array, or the like. Conventionally, nanotubes have at least a portion of the structure that has a hollow center, where nanowires or nanorods has a substantially solid core. For simplicity in use of terminology, as used herein, nanotube also refers to nanowire and nanorod. A nanotube refers to a nanometer-scale (nm-scale) tube-like structure with an aspect ratio of at least 100:1 (length:width or diameter). In some embodiments, the field emitter 104 is formed of an electrically conductive material with a high tensile strength and high thermal conductivity such as carbon, metal oxides (e.g., $Al_2O_3$, titanium oxide ($TiO_2$), zinc oxide (ZnO), or manganese oxide ($Mn_xO_y$, where x and y are integers)), metals, sulfides, nitrides, and carbides, either in pure or in doped form, or the like.

The first grid 106 is configured to control field emission from the field emitter 104. For example, the first grid 106 may be positioned from the field emitter 104 about 200 micrometers (μm). In other embodiments, the first grid 106 may be disposed at a different distance such as from about 2 μm to about 500 μm or from about 10 μm to about 300 μm.

Regardless, the first grid 106 is the electrode that may be used to create an electric field with a sufficient strength at the field emitter 104 to cause an emission of electrons. While some field emitters 104 may have other grids, electrodes, or the like, the structure that controls the field emission will be referred to as the first grid 106. In some embodiments, the first grid 106 (or electron extraction gate) may be the only grid that controls the field emission from the field emitter 104. In an example, the first grid 106 can be conductive mesh structure or a metal mesh structure.

A grid is an electrode made of a conductive material generally placed between the emitter of the cathode and the anode. A voltage potential is applied to grid to create a change in the electric field causing a focusing or controlling effect on the electrons and/or ions. The first grid 106 may be used to control the flow of electrons between the cathode and the anode. A grid can have the same or different voltage potential from the cathode, the anode, and other grids. The grid can be insulated from the cathode and anode. A grid can include a structure that at least partially surrounds the electron beam with at least one opening to allow the electron beam to pass from the emitter to the anode. A grid with a single opening can be referred to as an aperture grid. In an example, an aperture grid may not obstruct the path of the major portion of the electron beam. A grid with multiple openings is referred to as a mesh grid with a support structure between the openings. A mesh is a barrier made of connected strands of metal, fiber, or other connecting materials with openings between the connected strands. The connected strands (or bars) may be in the path of the electron beam and obstruct a portion of the electron beam. The amount of obstruction may depend on the width, depth, or diameter of the opening and the width or depth of the connected strands or bars of the mesh between the openings. In some examples, the obstruction of the mesh may be minor relative to the electrons passing through the openings of the mesh. Typically, the opening of the aperture grid is larger than the openings of the mesh grid. The grid can be formed of molybdenum (Mo), tungsten (W), copper (Cu), stainless steel, or other rigid electrically conductive material including those with a high thermal conductivity (e.g., >10 Watts/meters*Kelvin (W/m*K)) and/or high melt temperature (>1000 C). In an example with multiple emitters, each grid can be an electrode associated with a single field emitter 104 and the voltage potential for the grid can be individually controlled or adjusted for each field emitter 104 in the cathode.

The anode 112 may include a target (not illustrated) to receive the electron beam 140 emitted from the field emitter 104. The anode 112 may include any structure that may generate x-rays in response to incident electron beam 140. The anode 112 may include a stationary or rotating anode. The anode 112 may receive a voltage from the voltage source 118. The voltage applied to the anode 112 may be about 20-230 kilovolts (kV), about 50-100 kV, or the like (relative to the cathode or ground).

The second grid 108 is disposed between the first grid 106 and the anode 112. In some embodiments, the second grid 108 may be disposed about 1 to 2 millimeters (mm) from the field emitter 104. That is, the second grid 108 is disposed at a location that effectively does not cause the emission of electrons from the field emitter 104. In other embodiments, the second grid 108 may be disposed further away than 1-2 mm. For example, the second grid 108 may be disposed 10s of millimeters from the field emitter 104, such as 10-50 mm from the field emitter 104. In some embodiments, the second grid 108 has a minimum separation from the first grid 106 of about 1 mm.

The x-ray source **100*a* includes a voltage source 118. The voltage source 118 may be configured to generate multiple voltages. The voltages may be applied to various structures of the x-ray source 100*a*. In some embodiments, the voltages may be different, constant (i.e., direct current (DC)), variable, pulsed, dependent, independent, or the like. In some embodiments, the voltage source 118 may include a variable voltage source where the voltages may be temporarily set to a configurable voltage. In some embodiments, the voltage source 118 may include a variable voltage source configurable to generate time varying voltage such as pulsed voltages, arbitrarily varying voltages, or the like. Dashed line 114 represents a wall of a vacuum enclosure 114*a* containing the field emitter 104, grids 106 and 108, and anode 112. Feedthroughs 116 may allow the voltages from the voltage source 118 to penetrate the vacuum enclosure 114*a*. Although a direct connection from the feedthroughs 116 is illustrated as an example, other circuitry such as resistors, dividers, or the like may be disposed within the vacuum enclosure 114*a*. Although absolute voltages may be used as examples of the voltages applied by the voltage source 118, in other embodiments, the voltage source 118** may be configured to apply voltages having the same relative separation regardless of the absolute value of any one voltage.

In some embodiments, the voltage source 118 is configured to generate a voltage of down to −3 kilovolts (kV) or between 0.5 kV and −3 kV for the field emitter 104. The voltage for the first grid 106 may be about 0 volts (V) or ground. The voltage for the second grid 108 may be about 100 V, between 80 V and 120 V or about 1000 V, or the like. The voltage for the second grid 108 can be either negative or positive voltage.

Although particular voltages have been used as examples, in other embodiments, the voltages may be different. For example, the voltage applied to the second grid 108 may be higher or lower than the voltage applied to the first grid 106. The voltage applied to the first grid 106 and second grid 108 may be the same. In some embodiments, if the voltage of the second grid 108 is higher than the voltage applied to the first grid 106, ions may be expelled. In some embodiments, the second grid 108 may be used to adjust a focal spot size and/or adjust a focal spot position. The focal spot refers to the area where the electron beam 140 coming from field emitter 104 in the cathode strikes the anode 112. The voltage source 118 may be configured to receive feedback related to the focal spot size, receive a voltage setpoint for the voltage applied to the second grid 108 based on such feedback, or the like such that the voltage applied to the second grid 108 may be adjusted to achieve a desired focal spot size. In some embodiments, the voltage source 118 may be configured to apply a negative voltage to the first or second grids 106 and 108 and/or raise the voltage of the field emitter 104 to shut down the electron beam 140, such as if an arc is detected. Although positive voltages and negative voltages, voltages relative to a particular potential such as ground, or the like have been used as examples, in other embodiments, the various voltages may be different according to a particular reference voltage.

An arc may be generated in the vacuum enclosure **114*a*. The arc may hit the field emitter 104, which could damage or destroy the field emitter 104, causing a catastrophic failure. When a voltage applied to the second grid 108 is at a voltage closer to the voltage of the field emitter 104 than the anode 112, the second grid 108 may provide a path for the arc other than the field emitter 104. As a result, the possibility of damage to the field emitter 104** may be reduced or eliminated.

In addition, ions may be generated by arcing and/or by ionization of evaporated target material on the anode 112. These ions may be positively charged and thus attracted to the most negatively charged surface, such as the field emitter 104. The second grid 108 may provide a physical barrier to such ions and protect the field emitter 104 by casting a shadow over the field emitter 104. In addition, the second grid 108 may decelerate the ions sufficiently such that any damage due to the ions incident on or colliding with the field emitter 104 may be reduced or eliminated.

As described above, the second grid 108 may be relatively close to the field emitter 104, such as on the order of 1 mm to 30 mm or more. The use of a field emitter such as the field emitter 104 may allow the second grid 108 to be positioned at this closer distance as the field emitter 104 is operated at a lower temperature than a traditional tungsten cathode. The heat from such a traditional tungsten cathode may warp and/or distort the second grid 108, affecting focusing or other operational parameters of the x-ray source 100*a*.

The x-ray source 100*a* may include a middle electrode 110. In some embodiments, the middle electrode 110 may operate as a focusing electrode. The middle electrode 110 may also provide some protection for the field emitter 104, such as during high voltage breakdown events. In an example with multiple emitters, the middle electrode 110 may have a voltage potential that is common for the field emitters 104 of the cathode. In an example, the middle electrode 110 is between the second grid 108 (or first grid 106) and the anode 112.

Referring to FIG. 1B, in some embodiments, the x-ray source 100*b* may be similar to the x-ray source 100*a* of FIG. 1A. However, in some embodiments, the position of the second grid 108 may be different. Here, the second grid 108 is disposed on an opposite side of the middle electrode 110 such that it is disposed between the middle electrode 110 and the anode 112.

Referring to FIG. 1C, in some embodiments, the x-ray source 100*c* may be similar to the x-ray source 100*a* or 100*b* described above. However, the x-ray source 100*c* includes multiple second grids 108 (or additional grids). Here two second grids 108-1 and 108-2 are used as examples, but in other embodiments, the number of second grids 108 may be different.

The additional second grid or grids 108 may be used to get more protection from ion bombardment and arcing. In some embodiments, if one second grid 108 does not provide sufficient protection, one or more second grids 108 may be added to the design. While an additional second grid 108 or more may reduce the beam current reaching the anode 112, the reduced beam current may be offset by the better protection from arcing or ion bombardment. In addition, the greater number of second grids 108 provides additional flexibility is applying voltages from the voltage source 118. The additional voltages may allow for one second grid 108-1 to provide some protection while the other second grid 108-2 may be used to tune the focal spot of the electron beam 140. For example, in some embodiments, the voltages applied to the second grid 108-1 and the second grid 108-2 are the same while in other embodiments, the voltages are different.

As illustrated, the second grid 108-2 is disposed between the second grid 108-1 and the middle electrode 110. However, in other embodiments, the second grid 108-2 may be disposed in other locations between the second grid 108-1 and the anode 112 such as on an opposite side of the middle electrode 110 as illustrated in FIG. 1B. In some embodiments, some to all of the second grids 108 are disposed on one side or the other side of the middle electrode 110.

In some embodiments, the second grid 108-2 may be spaced from the second grid 108-1 to reduce an effect of the second grid 108-2 on transmission of the electrons. For example, the second grid 108-2 may be spaced 1 mm or more from the second grid 108-1. In other embodiments, the second grid 108-2 may be spaced from the second grid 108-1 to affect control of the focal spot size.

In various embodiments, described above, dashed lines were used to illustrate the various grids 106 and 108. Other embodiments described below include specific types of grids. Those types of grids may be used as the grids 106 and 108 described above.

Figure 2:
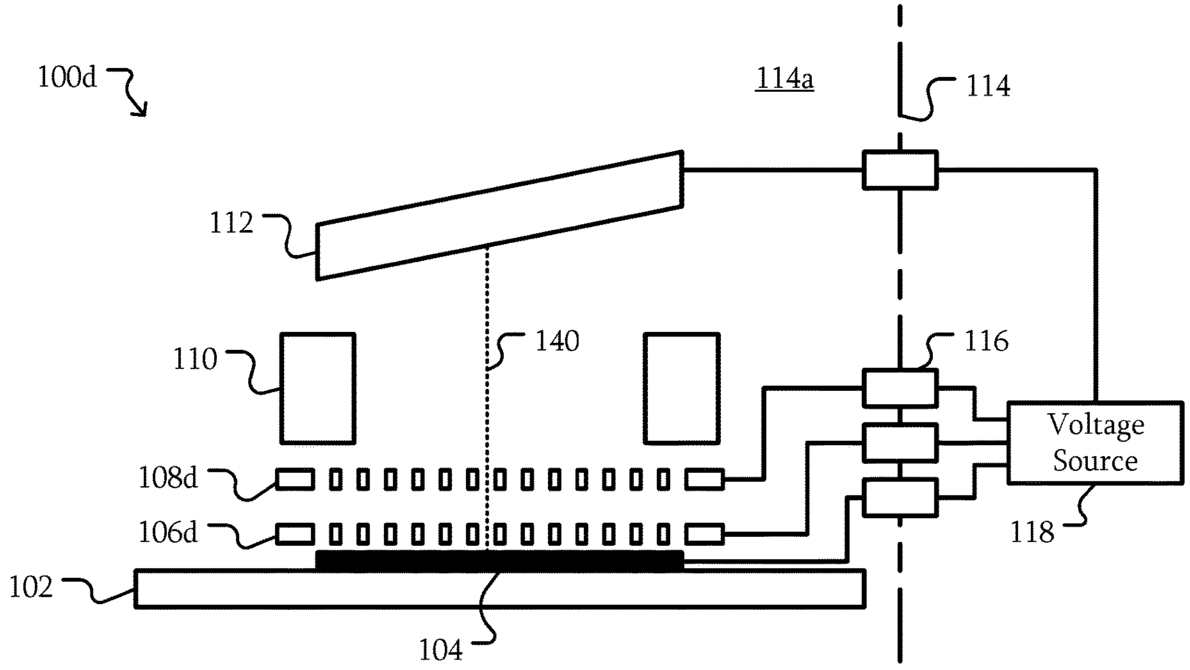
FIG. 2 is a block diagram of a field emitter x-ray source with multiple mesh grids according to some embodiments.
Figure 3A:
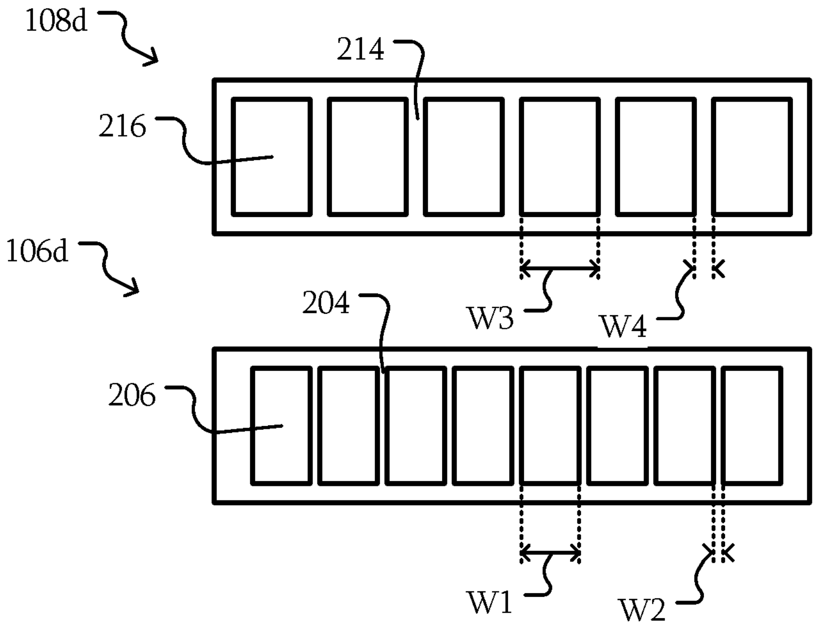
FIG. 3A-3B are top views of examples of mesh grids of a field emitter x-ray source with multiple mesh grids according to some embodiments.
Figure 3B:
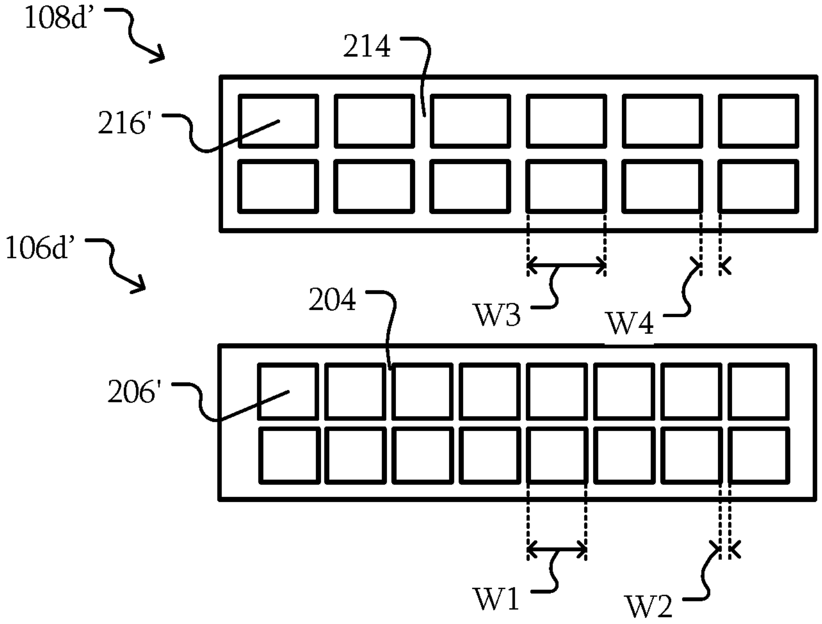

FIG. 2 is a block diagram of a field emitter x-ray source with multiple mesh grids according to some embodiments. FIGS. 3A-3B are top views of examples of mesh grids of a field emitter x-ray source with multiple mesh grids according to some embodiments. Referring to FIGS. 2 and 3A, in some embodiments, the grids 106*d* and 108*d* are mesh grids. That is, the grids 106 and 108 include multiple openings 206 and 216, respectively. As illustrated, the openings 206 and 216 may be disposed in a single row of openings. Although a particular number of openings 206 and 216 are used as an example, in other embodiments, the number of either or both may be different.

In some embodiments, a width W1 of the opening 206 of the first grid 106*d* may be about 125 μm. In some embodiments, the width W1 may be less than a separation of the first grid 106*d* and the field emitter 104. For example, the width W1 may be less than 200 μm. A width W2 of the bars 204 may be about 10 μm to about 50 μm, about 25 μm, or the like. A width W3 of the opening 216 of the second grid 108*d* may be about 225 μm. A width W4 of the bars 214 of the second grid 108*d* may be about 10 μm to about 50 μm, about 25 μm, or the like. Thus, in some embodiments, the openings 206 and 216 may have different widths and may not be aligned. In some embodiments, the thickness of the grids 106*d* and 108*d* may be about 10 μm to about 100 μm, about 75 μm, or the like; however, in other embodiments the thickness of the grids 106*d* and 108*d* may be different, including different from each other. In addition, in some embodiments, the widths W1-W4 or other dimensions of the first grid 106*d* and the second grid 108*d* may be selected such that the second grid 108*d* is more transparent to the electron beam 140 than the first grid 108*d*.

Referring to FIG. 3B, in some embodiments, at least one of the first grid 106 and the second grid 108 may include multiple rows where each row includes multiple openings. For example, the first grid 106*d*' includes two rows of multiple openings 206' and the second grid 108*d*' includes two rows of multiple openings 208'. While two rows have been used as an example, in other embodiments, the number of rows may be different. While the same number of rows has been used as an example between the first grid 106*d*' and the second grid 108*d*', in other embodiments, the number of rows between the first grid 106*d*' and the second grid 108*d*' may be different.

Figure 4:
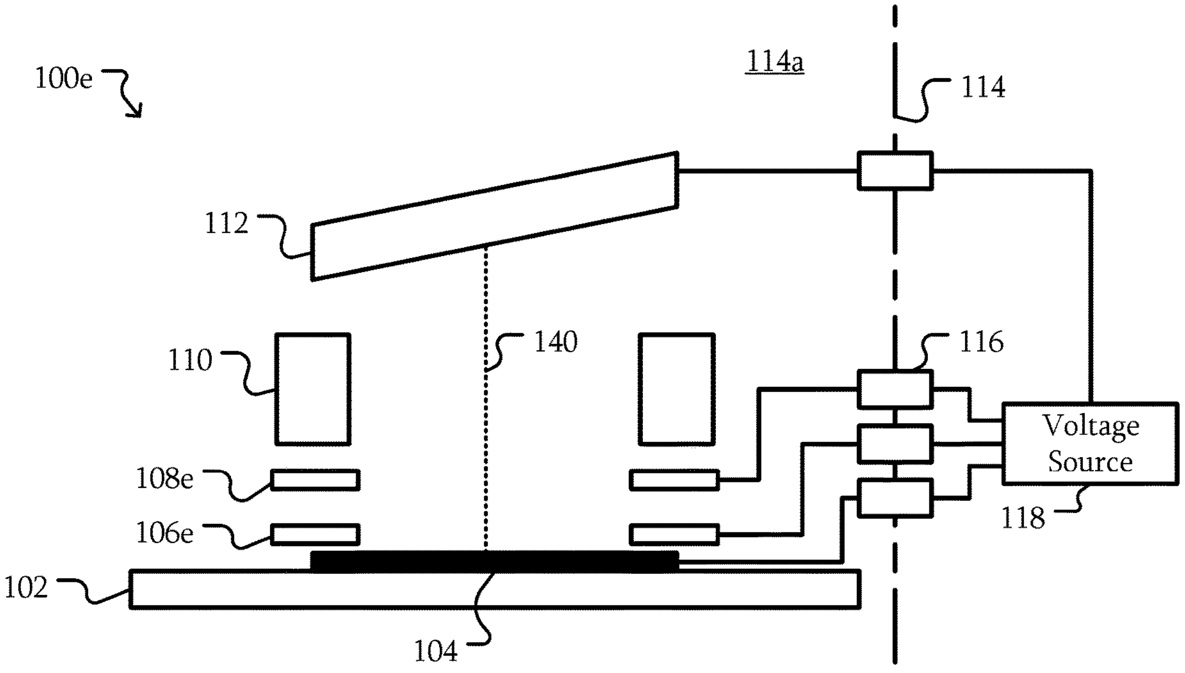
FIG. 4 is a block diagram of a field emitter x-ray source with multiple aperture grids according to some embodiments.

FIG. 4 is a block diagram of a field emitter x-ray source with multiple aperture grids according to some embodiments. In some embodiments, the x-ray source 100*e* may be similar to the x-ray sources 100 described herein. However, the X-ray source 100*e* includes grids 106*e* and 108*e* that are aperture grids. That is, the grids 106*e* and 108*e* each include a single opening. As will be described in further detail below, in other embodiments, the grid 106*e* may be a mesh grid while the grid 108*e* is an aperture grid. In some embodiments, an aperture grid 106*e* or 108*e* may be easier to handle and fabricate.

Figure 5A:
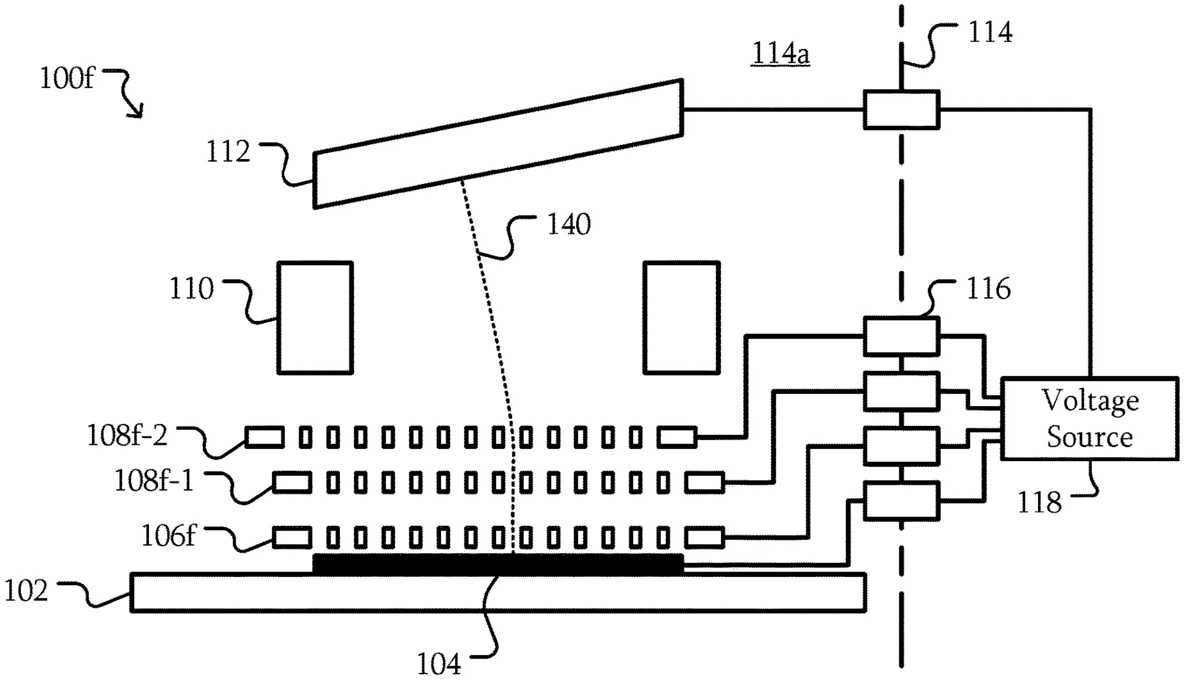
FIGS. 5A-5B are block diagrams of field emitter x-ray sources with multiple offset mesh grids according to some embodiments.
Figure 5B:
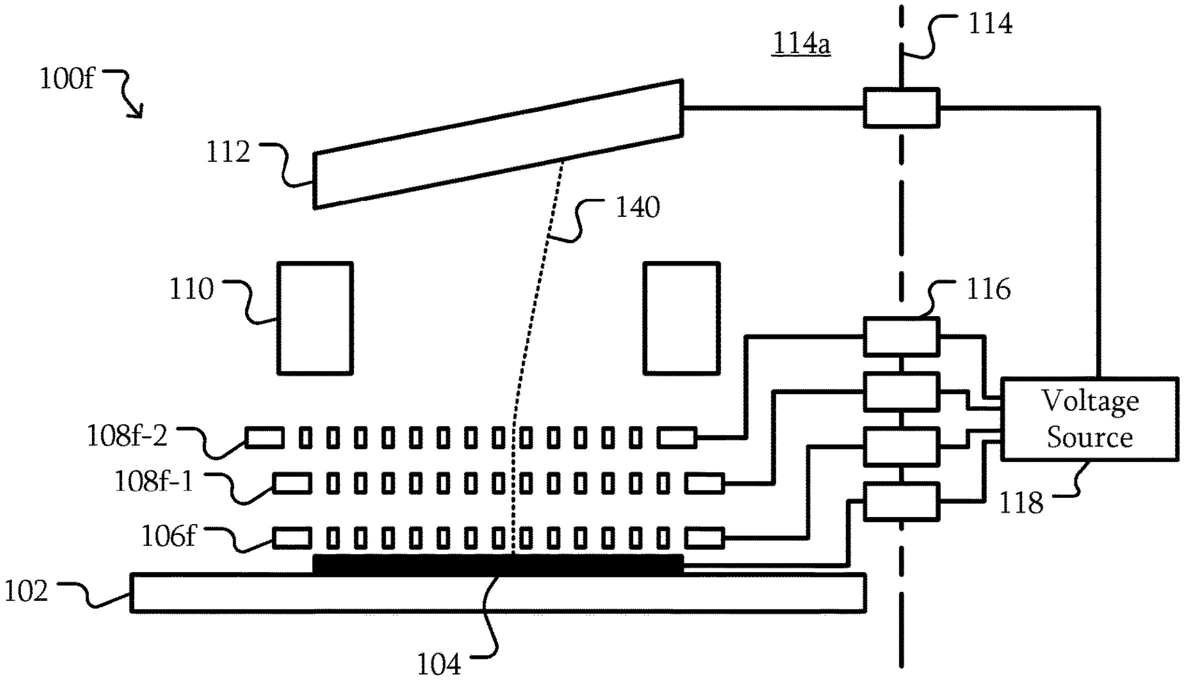

FIGS. 5A-5B are block diagrams of field emitter x-ray sources with multiple offset mesh grids according to some embodiments. Referring to FIGS. 5A and 5B, the x-ray source 100*f* may be similar to the other x-ray sources 100 described herein. In some embodiments, the x-ray source 100*f* includes second grids 108*f*-1 and 108*f*-2 that are laterally offset from each other (relative to the surface of the emitter 104). A different voltage may be applied to each of the second grids 108*f*-1 and 108*f*-2. As a result, the electron beam 140 may be steered using the voltage. For example, in FIG. 5A, 100 V may be applied to second grid 108*f*-2 while 0 V may be applied to second grid 108*f*-1. In FIG. 5B, 0V may be applied to second grid 108*f*-2 while 100 V may be applied to second grid 108*f*-1. Accordingly, the direction of the electron beam 140 may be affected. Although particular examples of voltages applied to the second grids 108*f*-1 and 108*f*-2 are used as an example, in other embodiments, the voltages may be different.

Figure 6A:
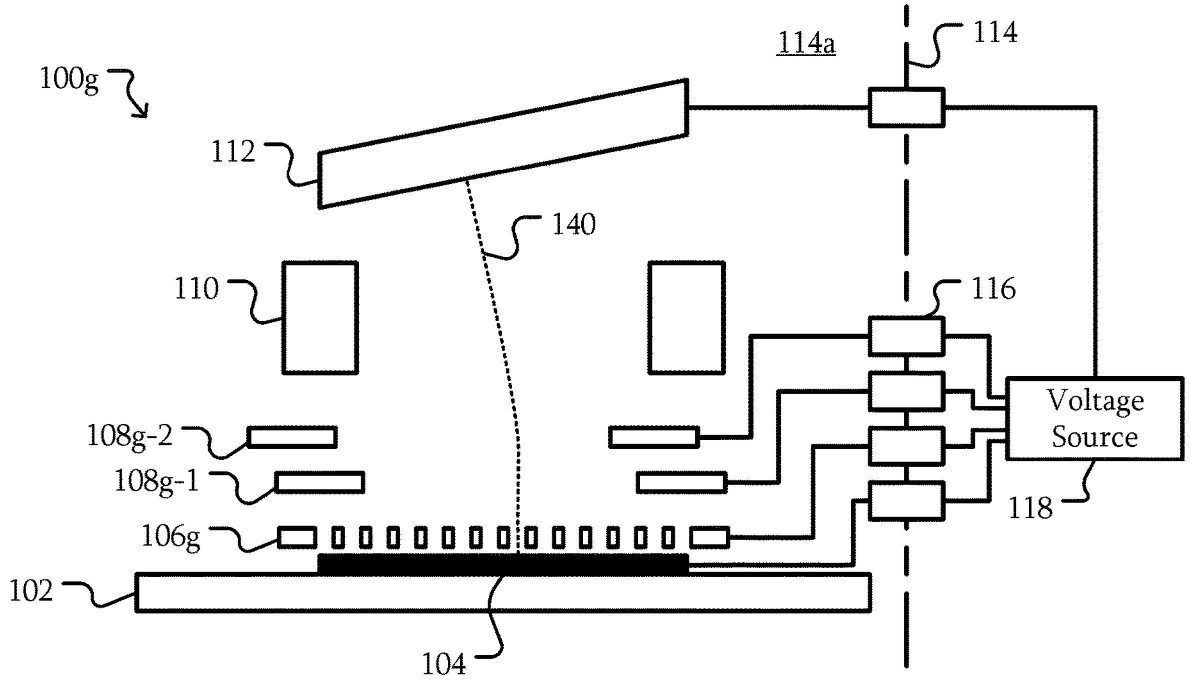
FIGS. 6A-6B are block diagrams of field emitter x-ray sources with multiple offset mesh grids according to some embodiments.
Figure 6B:
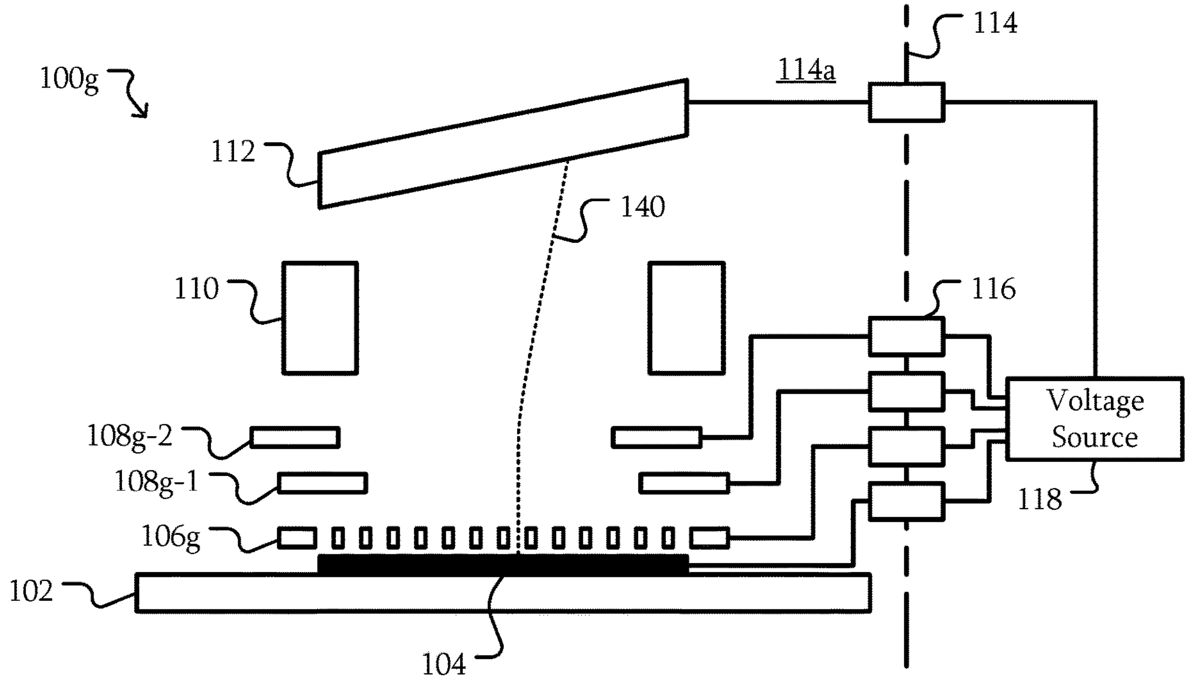

FIGS. 6A-6B are block diagrams of field emitter x-ray sources with multiple offset mesh grids according to some embodiments. Referring to FIGS. 6A and 6B, the x-ray source 100*g* may be similar to the x-ray source 100*f*. However, the x-ray source 100*g* includes apertures as the grids 108*g*-1 and 108*g*-2. The aperture grids 108*g*-1 and 108*g*-2 may be used in a manner similar to that of the mesh grids 108*f*-1 and 108*f*-2 of FIGS. 5A and 5B.

Figure 7:
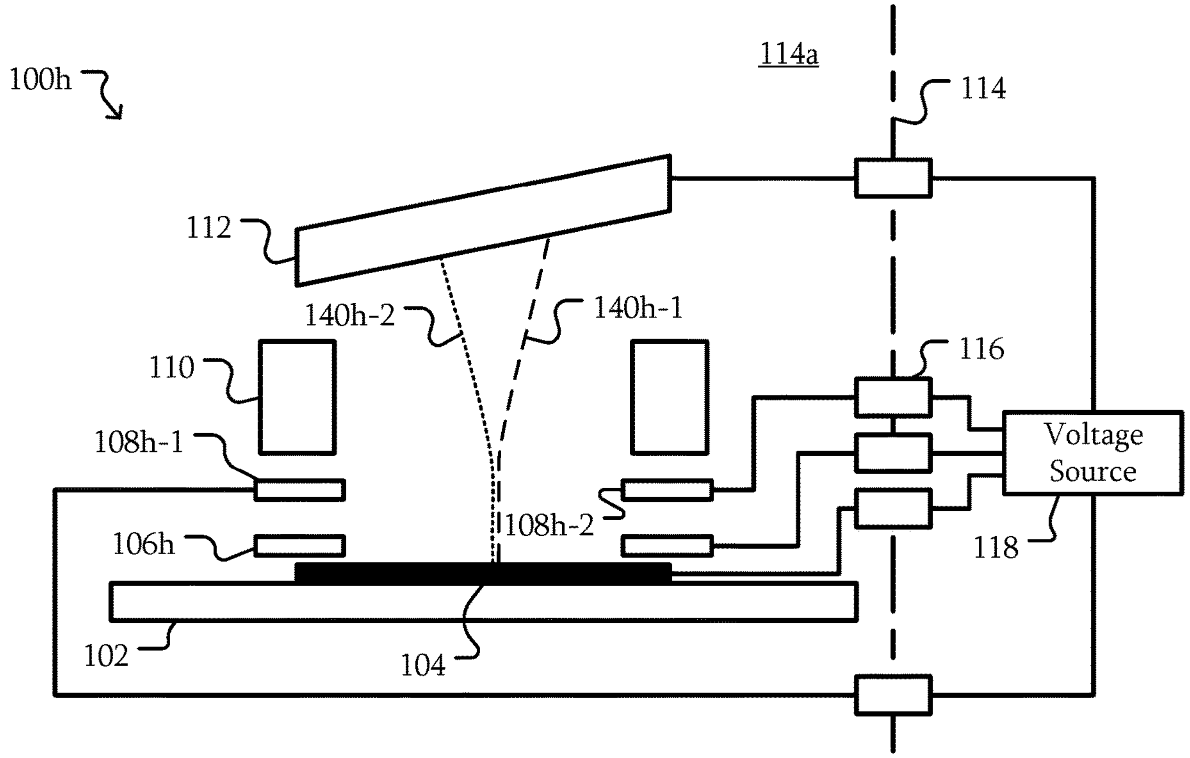
FIG. 7 is a block diagram of a field emitter x-ray source with multiple split grids according to some embodiments.

FIG. 7 is a block diagram of a field emitter x-ray source with multiple split grids according to some embodiments. The x-ray source 100*h* may be similar to the x-ray source 100*e* of FIG. 4. However, the x-ray source 100*h* may include split grids 108*h*-1 and 108*h*-2. The grids 108*h*-1 and 108*h*-2 may be disposed at the same distance from the field emitter 104. However, the voltage source 118 may be configured to apply independent voltages to the split grids 108*h*-1 and 108*h*-2. While the voltages may be the same, the voltages may also be different. As a result, a direction of the electron beam 140*h* may be controlled resulting in electron beam 140*h*-1 or 140*h*-2 depending on the voltages applied to the grids 108*h*-1 and 108*h*-2.

Figure 8:
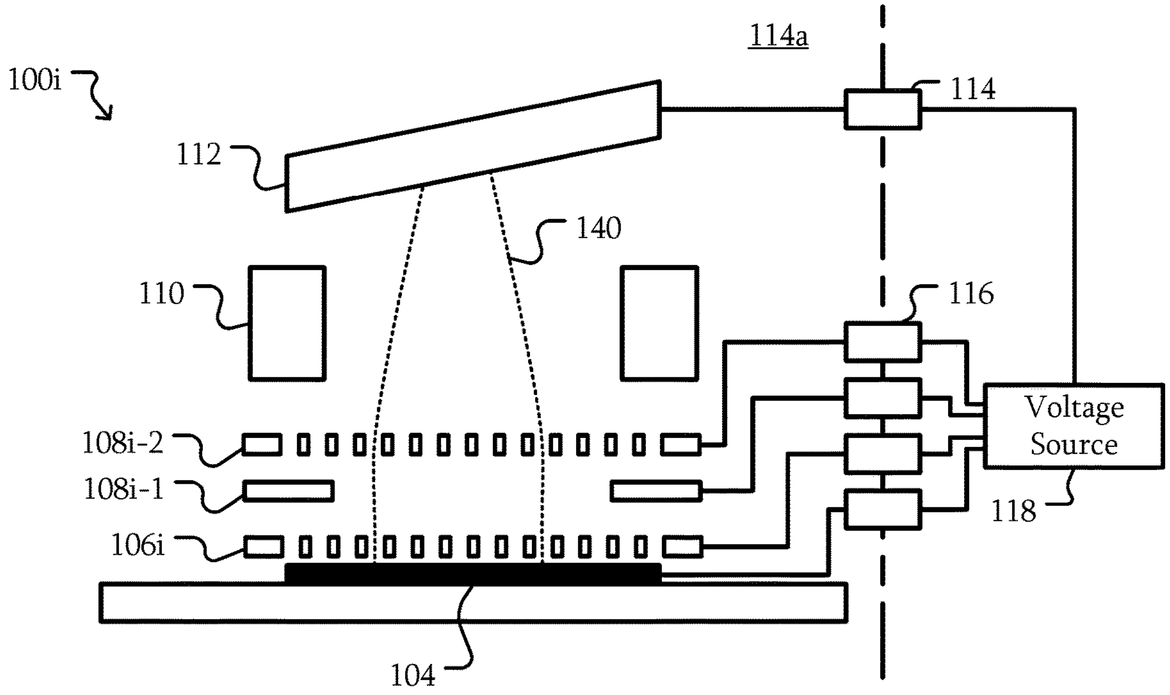
FIG. 8 is a block diagram of a field emitter x-ray source with mesh and aperture grids according to some embodiments.

FIG. 8 is a block diagram of a field emitter x-ray source with mesh and aperture grids according to some embodiments. The x-ray source 100*i* may be similar to the x-ray source 100 described herein. However, the x-ray source 100*i* includes an aperture grid 108*i*-1 and a mesh grid 108*i*-1. In some embodiments, the mesh grid 108*i*-1 may be used to adjust the focal spot size, shape, sharpen, or otherwise better define the edges of the electron beam 140, or the like. A better defined edge of the electron beam 140 can be an edge were the beam current flux changes more in a shorter distance at the edge than a less defined edge. The mesh grid 108*i*-2 may be used to collect ions and/or provide protection for the first grid 106*i*, field emitter 104 or the like. For example, by applying a negative bias of about −100 V to the mesh grid 108*i*-1, the electron beam 140 may be focused.

Figure 9A:
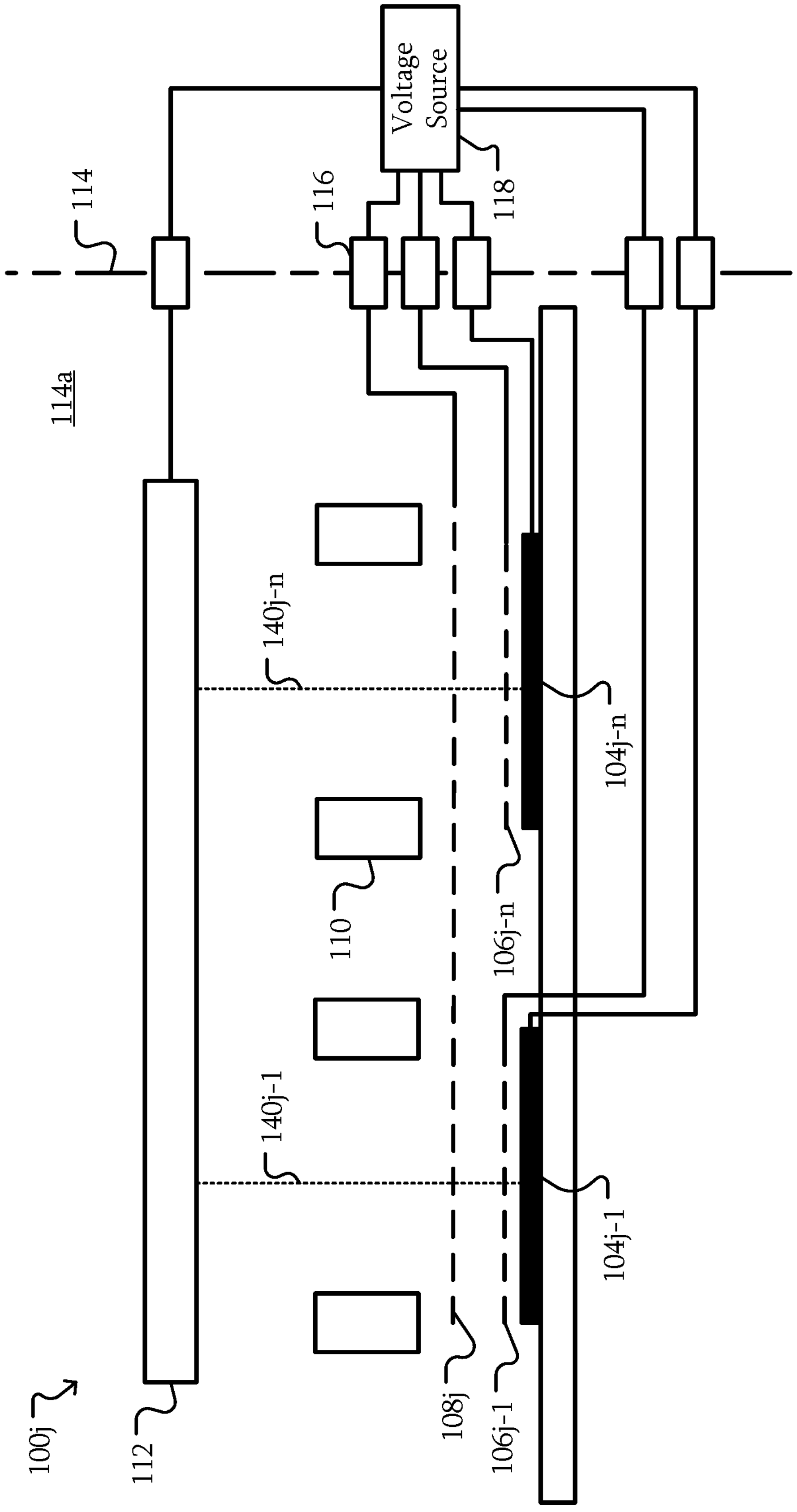
FIGS. 9A-9B are block diagrams of field emitter x-ray sources with multiple field emitters according to some embodiments.
Figure 9B:
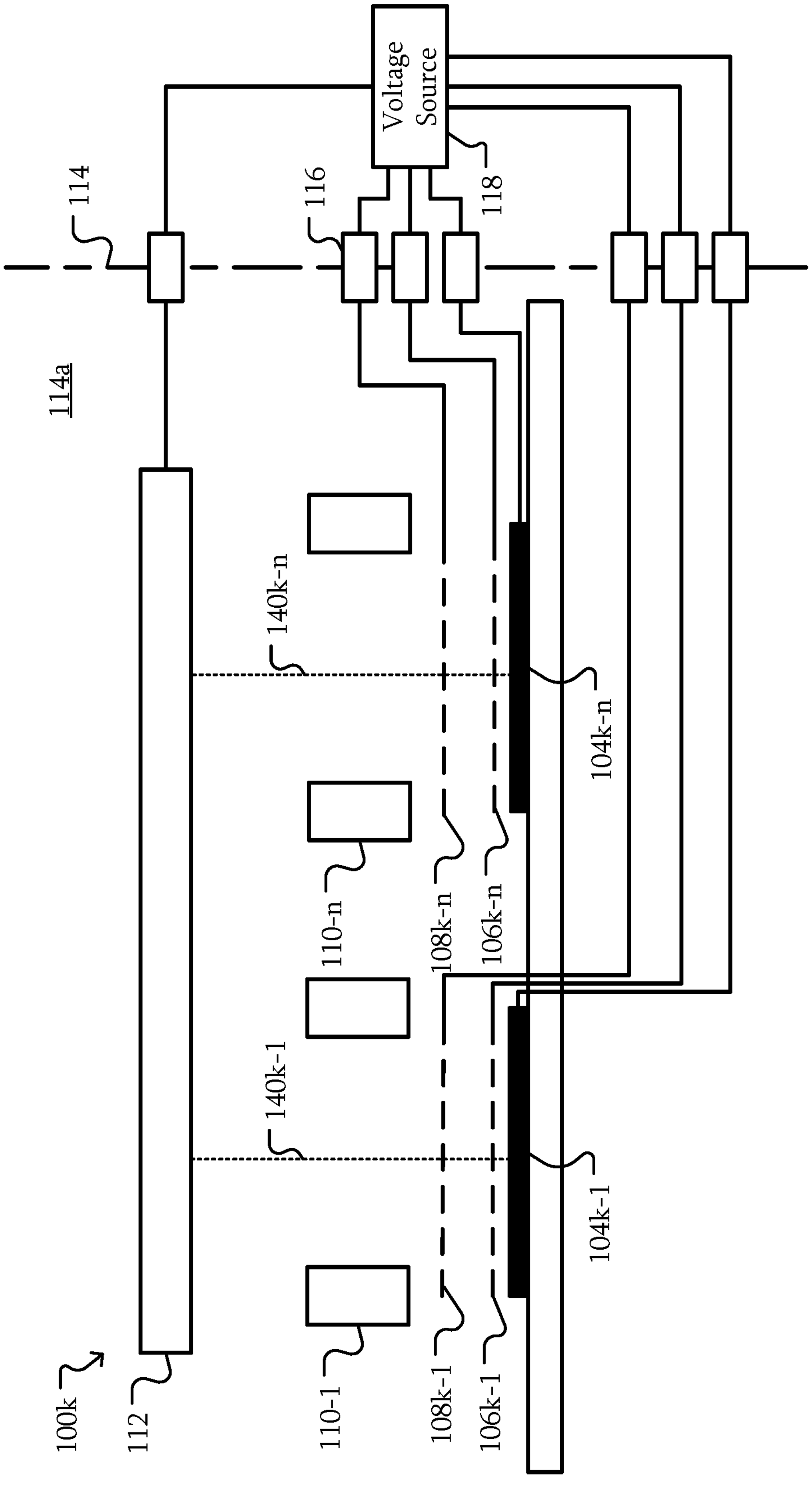

FIGS. 9A-9B are block diagrams of field emitter x-ray sources with multiple field emitters according to some embodiments. Referring to FIG. 9A, in some embodiments, the x-ray source 100*j* may be similar to the other x-ray source 100 described herein. However, the x-ray source 100*j* includes multiple field emitters 104*j*-1 to 104*j*-*n* where n is any integer greater than 1. Although the anode 112 is illustrated as not angled in FIGS. 9A-9B, in some embodiments, the anode 112 may be angled and the multiple field emitters 104*j*-1 to 104*j*-*n* may be disposed in a line perpendicular to the slope of the anode. That is, the views of FIGS. 9A-9B may be rotated 90 degrees relative to the views of FIGS. 1A-2, and 4-8.

Each of the field emitters 104*j* is associated with a first grid 106*j* that is configured to control the field emission from the corresponding field emitter 104*j*. As a result, each of the field emitters 104*j* is configured to generate a corresponding electron beam 140*j*.

In some embodiments, a single second grid 108*j* is disposed across all of the field emitter 104*j*. While the second grid 108*j* is illustrated as being disposed between the first grids 106*j* and the middle electrodes 110*j*, the second grid 108*j* may be disposed in the various locations described above. As a result, the second grid 108*j* may provide the additional protection, steering, and/or focusing described above. In addition, multiple second grids 108*j* may be disposed across all of the field emitters 104*j*.

Referring to FIG. 9B, in some embodiments, the x-ray source 100*k* may be similar to the x-ray source 100*j*. However, each field emitter 104*j* is associated with a corresponding second grid 108*k*. Accordingly, the protection, steering, and/or focusing described above may be individually performed for each field emitter 104*k*.

In other embodiments, some of the field emitters 104 may be associated with a single second grid 108 similar to the second grid 108*j* of FIG. 9A while other field emitters 104 may be associated with individual second grids 108 similar to the second grids 108*k* of FIG. 9B.

In some embodiments, multiple field emitters 104 may be associated with individual second grids 108, each with individually controllable voltages. However, the middle electrodes 110 may include a single middle electrode 110 associated with each field emitter 104. In some embodiments, the middle electrodes 110-1 to 110-*n* may be separate structure but may have the same voltage applied by the voltage source 118, another voltage source, or by virtue of being attached to or part of a housing, vacuum enclosure, or the like.

Figure 10A:
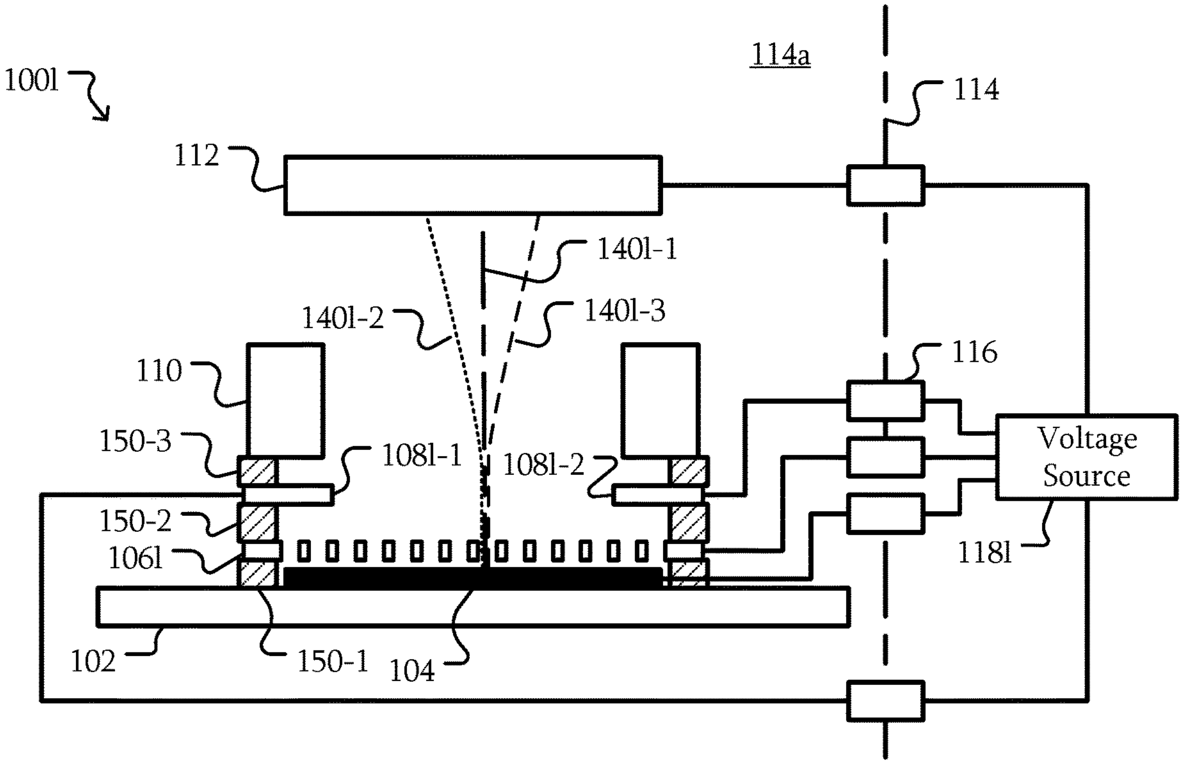
FIG. 10A is a block diagram of a field emitter x-ray source with multiple split grids according to some embodiments.

FIG. 10A is a block diagram of a field emitter x-ray source with multiple split grids according to some embodiments. The x-ray source 100*l* may be similar to the x-ray source 100*h* of FIG. 7. In some embodiments, an insulator 150-1 may be disposed on the substrate 102. The first grid 106*l* may be disposed on the insulator 150-1. A second insulator 150-2 may be disposed on the first grid 106*l*. The second grid 108*l*, including two electrically isolated split grids 108*l*-1 and 108*l*-2, may be disposed on the second insulator 150-2. A third insulator 150-3 may be disposed on the second grid 108*l*. The middle electrode 110 may be disposed on the third insulator 150-3. Although particular dimensions of the insulators 150 have been used for illustration, in other embodiments, the insulators 150 may have different dimensions. The insulators 150 may be formed from insulating materials such as ceramic, glass, aluminum oxide ($Al_2O_3$), aluminum nitride (AlN), silicon oxide or quartz ($SiO_2$), or the like The insulators 150 may be formed of the same or different materials.

In some embodiments the split grids 108*l*-1 and 108*l*-2 are insulated from each other so that different voltages can be applied to the split grids 108*l*-1 and 108*l*-2. These different voltages may be used to move the position of the focal spot on the anode 112. For example, when an equal potential is applied on both split grids 108*l*-1 and 108*l*-2, the focal spot should be located in or near the center of the anode as indicated by electron beam 140*l*-1. When a push (positive) potential is applied on the split grid 108*l*-2 and pull (negative) potential is applied on the split grid **108*l*-1, the focal spot shifts to the left as illustrated by electron beam 140*l*-2. Once a pull (negative) potential is applied on the split grid 108*l*-2 and push (positive) potential is applied on the split grid 108*l*-1, the focal spot can be shifted to the right as illustrated by the electron beam 140*l*-3**.

In some embodiments, the control of the voltages applied to the split grids **108*l*-1 and 108*l*-2 provides a way to scan or move the focal spot on the anode 112 surface. In some embodiments, instead of a fixed focal spot with very small focal spot size, power may be distributed on the anode 112 in a focal spot track with much larger area, which can significantly improve the power limit of the x-ray tube. That is, by scanning the focal spot along a track, the power may be distributed across a greater area. Although moving the focal spot in a direction in the plane of the figure has been used as an example, in other embodiments, the movement of the focal spot may be in different directions, multiple directions, or the like with second grids 108*l* disposed at appropriate positions around the electron beam 140*l*. In some embodiments, the focal spot width, focusing, defocusing, or the like may be adjusted by the use of the split grids 108*l*-1 and 108*l*-2**.

Figure 10B:
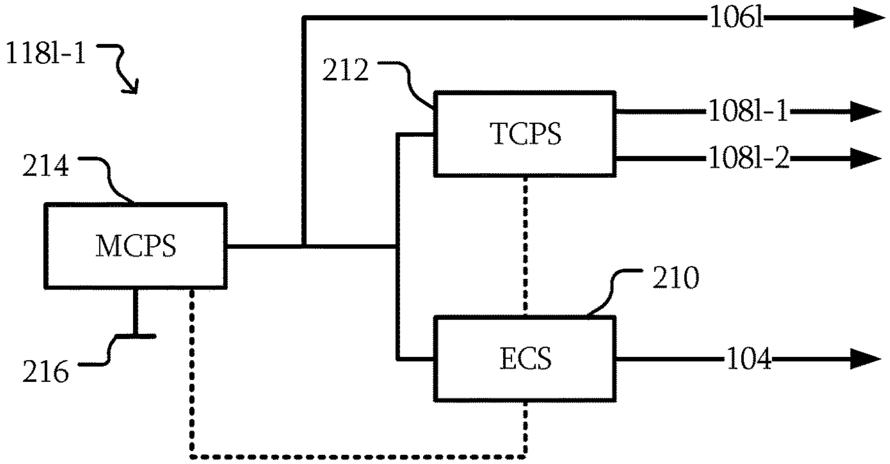
FIG. 10B-10C are block diagrams of a voltage sources 118*l* of FIG. 10A according to some embodiments.
Figure 10C:
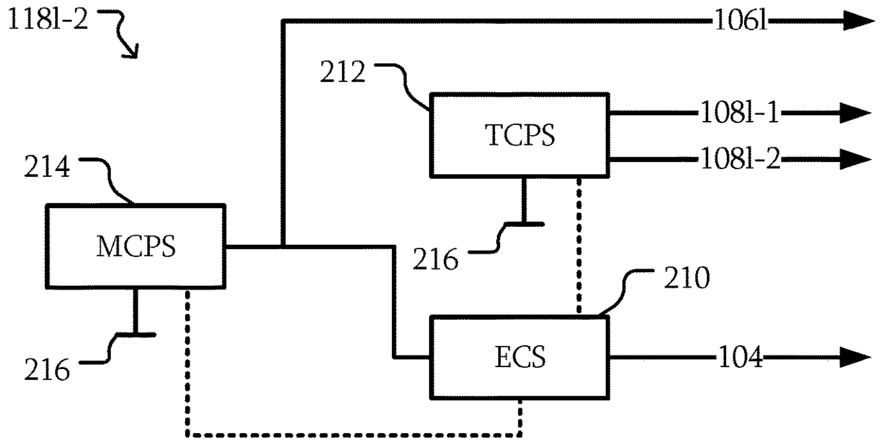

FIG. 10B-10C are block diagrams of a voltage sources **118*l* of FIG. 10A according to some embodiments. Referring to FIGS. 10A-10C, in some embodiments, the voltage sources 118*l*-1 and 118*l*-2 may include an electronic control system (ECS) 210, a toggling control power supply (TCPS) 212, and a mesh control power supply (MCPS) 216. The ECS 210, TCPS 212, and MCPS 216 may each include circuitry configured to generate various voltages described herein, including voltages of about +/−1 kV, +/−10 kV, or the like. The ECS 210 may be configured to generate the voltage for the field emitter 104. The ECS 210 may be configured to control one or more of the TCPS 212 and MCPS 216 to generate the voltages for the first grid 106*l* and the split grids 108*l*-1 and 108*l*-2. The dashed lines in FIGS. 10B and 10**C represent control interfaces between the various systems.

In some embodiments, the TCPS 212 of voltage source **118*l*-1 may be configured to generate the voltages for the split grids 108*l*-1 and 108*l*-2 with reference to the voltage for the first grid 106*l* as illustrated in FIG. 10B while in other embodiments, the TCPS 212 of voltage source 118*l*-2 may be configured to generate the voltages for the split grids 108*l*-1 and 108*l*-2 with reference to the ground 216 as illustrated in FIG. 10C. For example, when the TCPS 212 is referenced to the MCPS 214, the absolute value of the voltages for the split grids 108*l*-1 and 108*l*-2 are modulated automatically to maintain the same potential difference (electric field) between the split grids 108*l*-1 and 108*l*-2 and the first grid 106*l*. When the TCPS 212 is referenced to the main ground 216, the absolute value of the voltages applied to the split grids 108*l*-1 and 108*l*-2 may be fixed and the potential difference (electric field) between the split grids 108*l*-1 and 108*l*-2 and the first grid 106*l* may change with the variation of potential on the first grid 106*l*. In some embodiments, the voltage for the field emitter 104 may be generated by the ECS 210 with reference to the voltage for the first grid 106*l*. In other embodiments, the ECS 210 may be configured to generate the voltage for the field emitter 104 with reference to ground 216**.

Figure 10D:
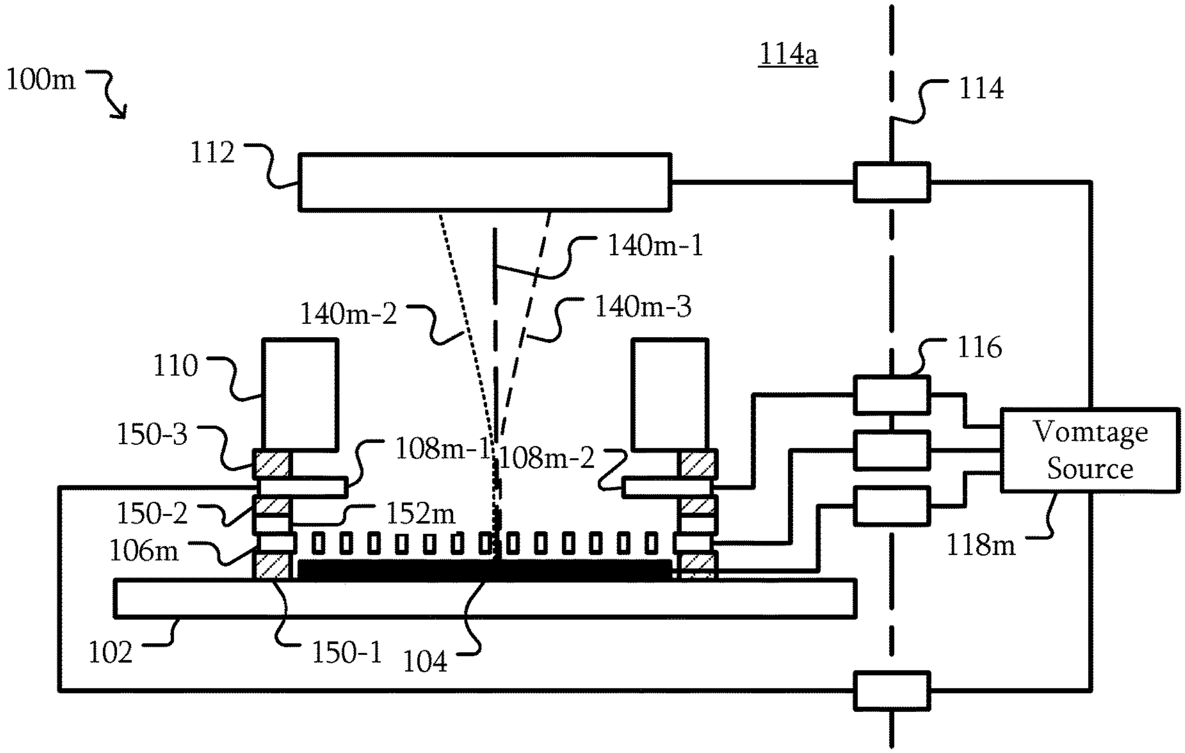
FIG. 10D is a block diagram of a field emitter x-ray source with multiple split grids according to some embodiments.

FIG. 10D is a block diagram of a field emitter x-ray source with multiple split grids according to some embodiments. The x-ray source **100*m* of FIG. 10D may be similar to the x-ray source 100*l* of FIG. 10A. However, in some embodiments, a gate frame 152*m* may be added on to of the first grid 106*m*. The gate frame 152*m* may be formed of metal, ceramic, or other material that may provide structural support to the first grid 106*m* to improve its mechanical stability. In some embodiments, the gate frame 152*m* may be thicker than the first grid 106*m*. For example, the thickness of the gate frame 152*m* may be about 1-2 mm while the thickness of the first grid 106*m* may be about 50-100 μm. In some embodiments, the gate frame 152*m* may extend into the opening through which the electron beam 140*m* passes. In other embodiments, the gate frame 152*m*** may only be on the periphery of the opening.

Figure 11A:
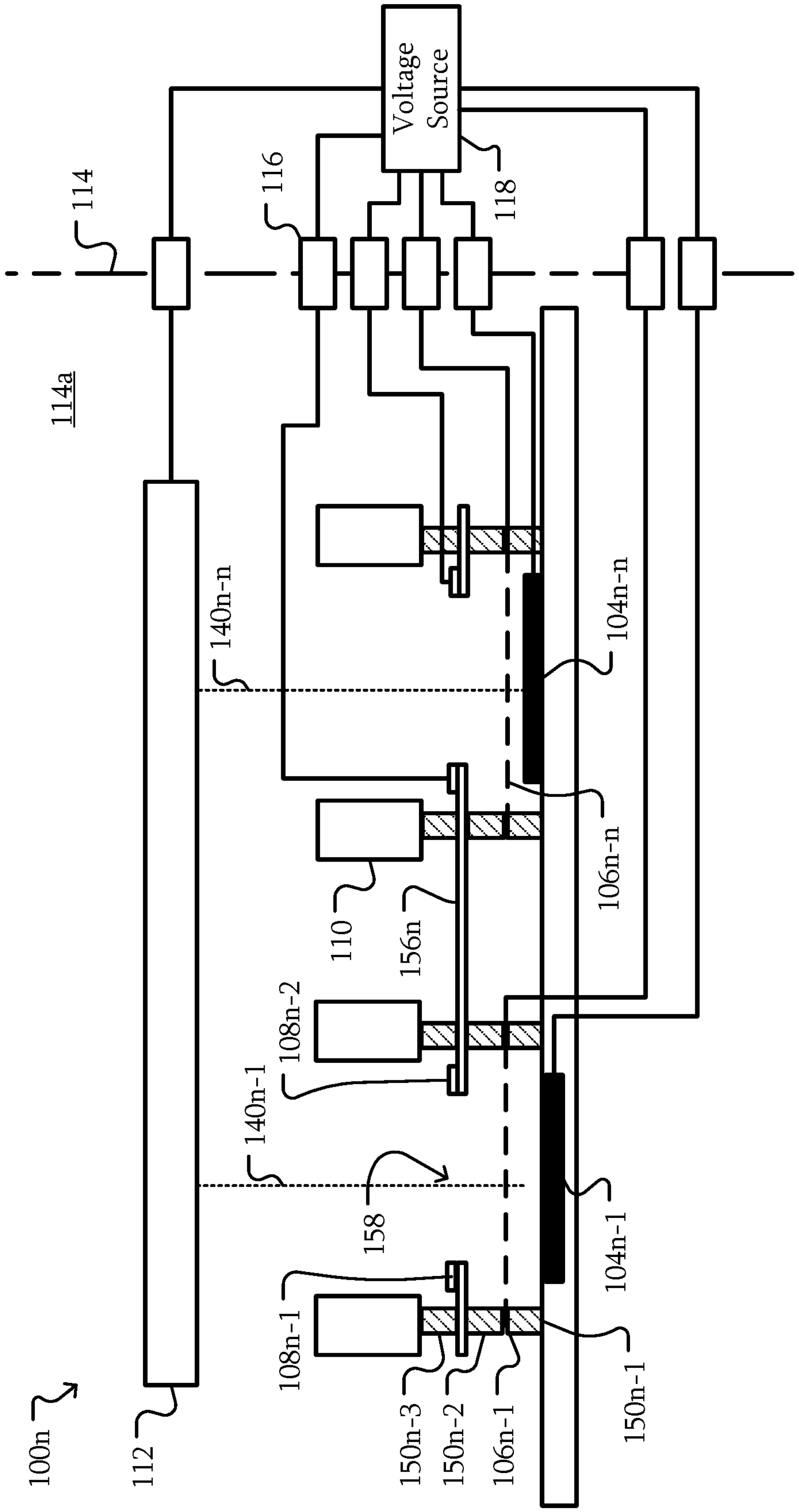
FIG. 11A is a block diagram of field emitter x-ray source with multiple split grids and multiple field emitters according to some embodiments.

FIG. 11A is a block diagram of field emitter x-ray source with multiple split grids and multiple field emitters according to some embodiments. The x-ray source **100*n* may be similar to the systems 100 described herein such as the systems 100*j* and 100*k* of FIGS. 9A and 9B. In some embodiments, the x-ray source 100*n* includes a spacer 156*n*. The spacer may be similar to the insulators 150, use materials similar to those of the insulators 150, use different materials, have different thicknesses, or the like. The split grids 108*n*-1 and 108*n*-2 may be formed on the spacer 156*n*. The spacer 156*n* may be common to each of the field emitters 104*n*-1 to 104*n*-*n***.

Figure 11B:
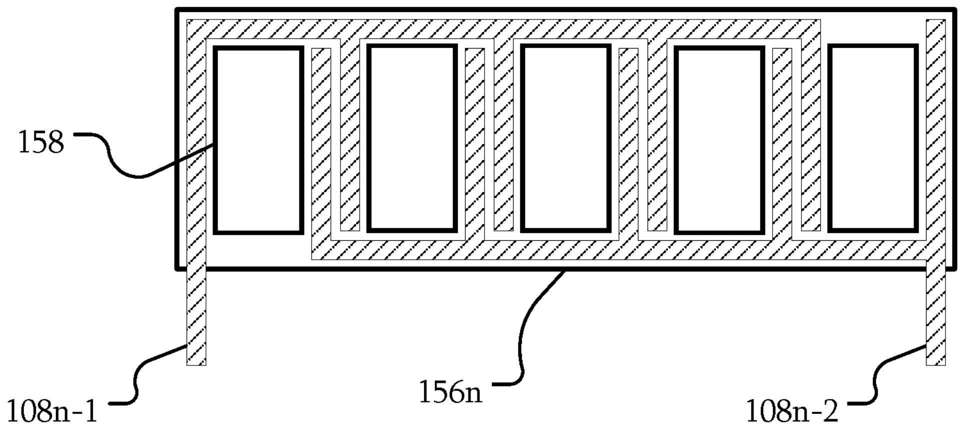
FIG. 11B is a block diagram of split grids according to some embodiments.

FIG. 11B is a block diagram of split grids according to some embodiments. Referring to FIGS. 11Ac and 11B, in some embodiments the split grids **108*n*-1 and 108*n*-2 may be formed on a spacer 156*n*. For example, the split grids 108*n*-1 and 108*n*-2 may be formed by screen printing, thermal evaporation, sputtering deposition, or other thin film deposition processes. The electrodes of the split grids 108*n*-1 and 108*n*-2 may be disposed on opposite sides of the multiple openings 158 of the spacer 156*n*. The split grids 108*n*-1 may be electrically connected with each other. Similarly, the split grids 108*n*-2 may be electrically connected with each other. However, an electrical connection may not exist between split grids 108*n*-1 and 108*n*-2 to allow the split grids 108*n* to operate independently and generate different electric potentials. An electric field may be generated across the openings 158 on the spacer 156*n* once different potentials are applied on the split grids 108*n*-1 and 108*n*-2. This may deflect electrons passing through the openings 158** as described above.

Figure 11C:
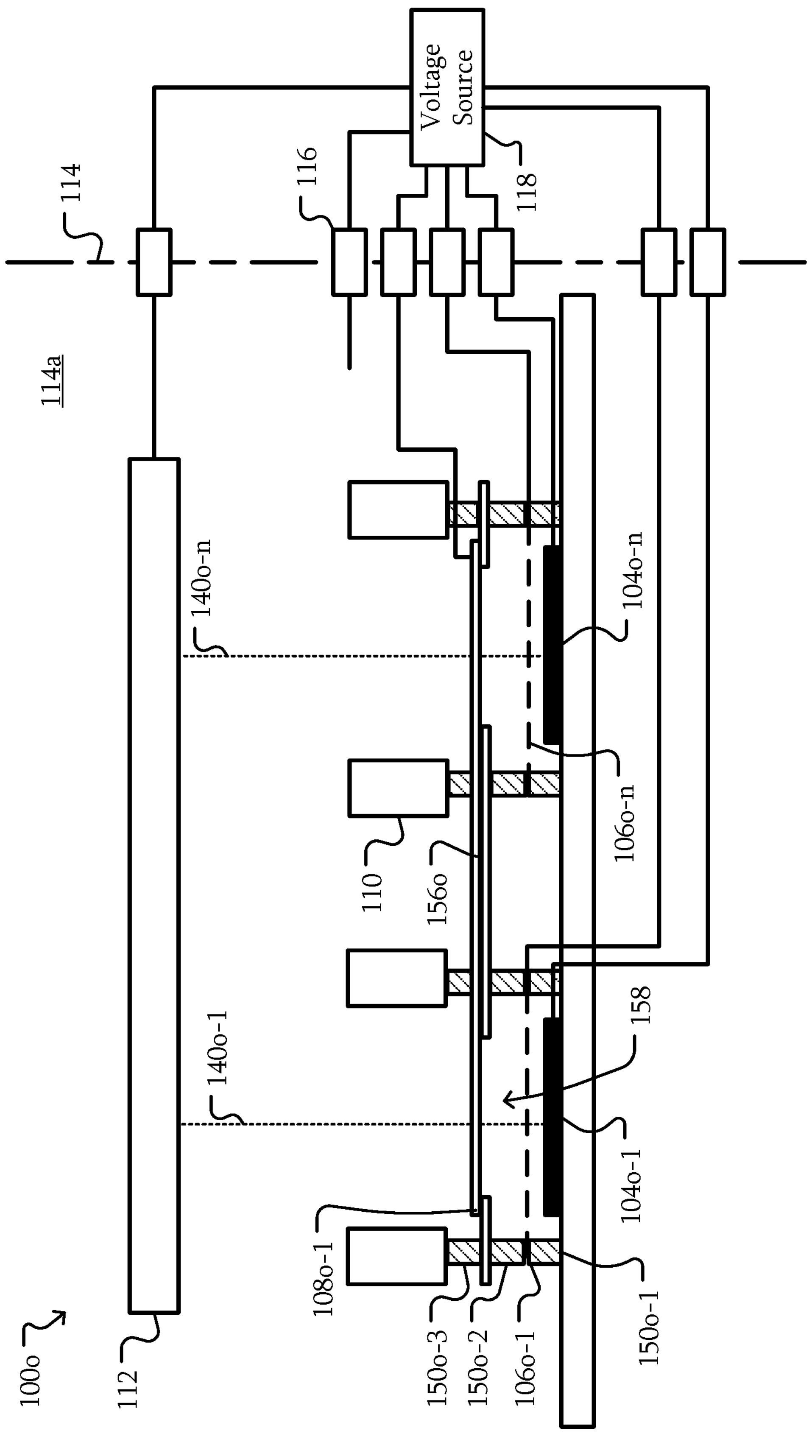
FIG. 11C is a block diagram of field emitter x-ray source with multiple split grids and multiple field emitters according to some embodiments.
Figure 11D:
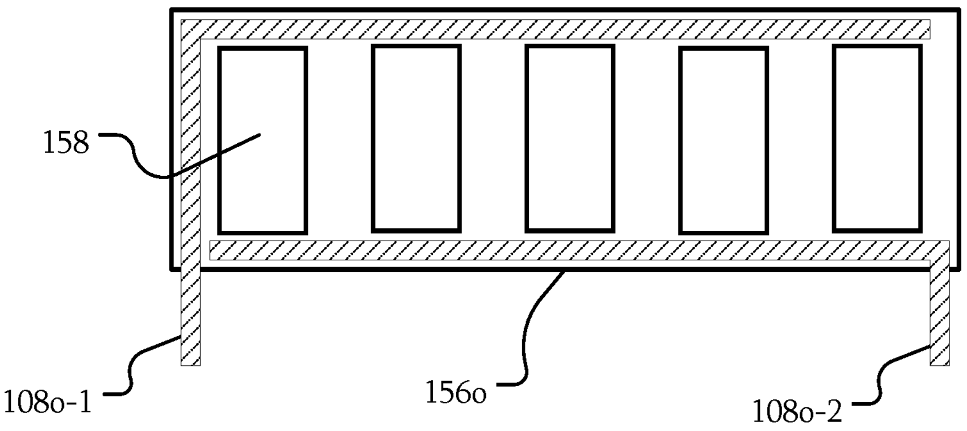
FIG. 11D is a block diagram of split grids according to some embodiments.

FIG. 11C is a block diagram of field emitter x-ray source with multiple split grids and multiple field emitters according to some embodiments. FIG. 11D is a block diagram of split grids according to some embodiments. Referring to FIGS. 11C and 11D, the x-ray source **100*o* may be similar to the x-ray source 100*n* of FIG. 11A. However, the split grids 108*o*-1 and 108*o*-2 are disposed on orthogonal sides of the openings 158 of the spacer 156*o* relative to the spacer 156*n*. As a result, the electron beams 140*o*-1 to 140*o*-*n* may be adjusted in an orthogonal direction. For ease of illustration, the split grid 108*o*-2 is not illustrated in FIG. 11C (as it is behind split grid 108*o*-1 in FIG. 11**C).

Figure 11E:
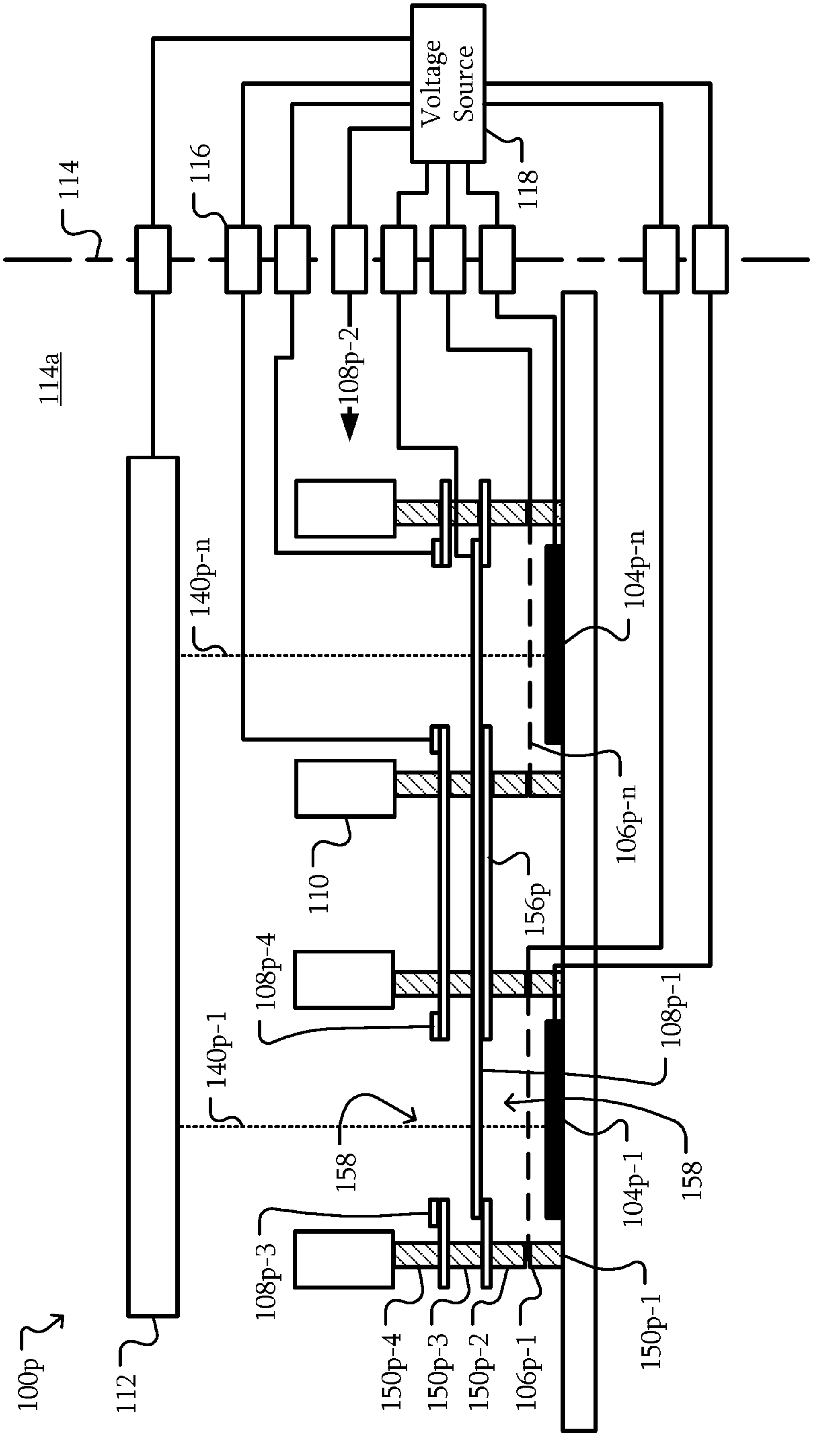
FIG. 11E is a block diagram of field emitter x-ray source with multiple split grids and multiple field emitters according to some embodiments.

FIG. 11E is a block diagram of field emitter x-ray source with multiple split grids and multiple field emitters according to some embodiments. Referring to FIGS. 11B, 11D, and 11E, the x-ray source **100*p* may be similar to the systems 100*n* and 100*o* described above. In particular, the x-ray source 100*p* includes split grids 108*p*-1 and 108*p*-2 similar to split grids 108*o*-1 and 108*o*-2 and split grids 108*p*-3 and 108*p*-4 similar to split grids 108*n*-1 and 108*n*-2. Accordingly, the x-ray source 100*p* may be configured to adjust the focal spot as described above in multiple directions simultaneously, independently, or the like. Although an order or stack of the split grids 108*p*-1 and 108*p*-2** has been used as an example, in other embodiments, the order or stack may be different.

Figure 11F:
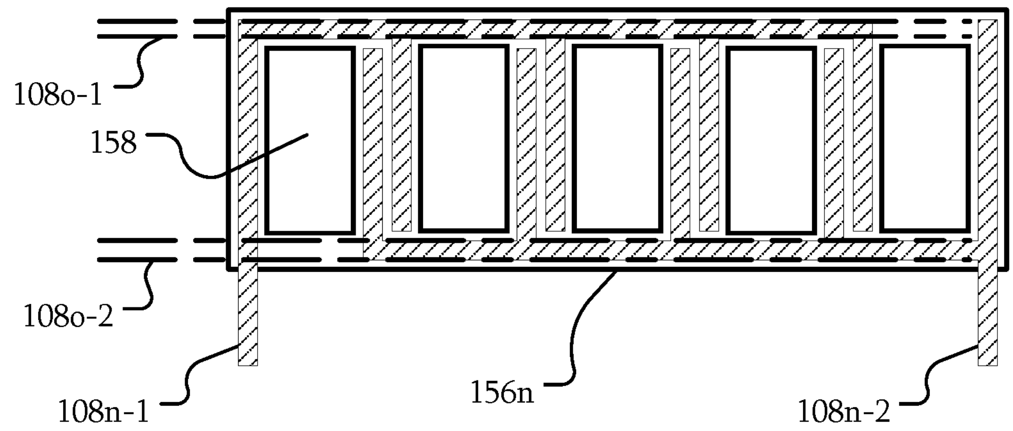
FIG. 11F is a block diagram of split grids according to some embodiments.

FIG. 11F is a block diagram of split grids according to some embodiments. In some embodiments, the split grids 108*o* and 108*n* of FIGS. 11B and 11D may be combined on the same spacer 156*n*. For example, the split grids 108*o* may be disposed on an opposite side of the spacer 156*n* from the split grids 108*n*. Electrodes for the split grids 108*o* are illustrated with dashed lines to show the split grids 108*o* on the back side of the spacer 156*n*. In some embodiments, the electrodes for the split grids 108*o* may be on the same side as the split grids 108*n* with vias, metalized holes, or other electrical connections passing through the spacer 156*n*.

Some embodiments include an x-ray source, comprising: an anode 112; a field emitter 104 configured to generate an electron beam 140; a first grid 106 configured to control field emission from the field emitter 104; and a second grid 108 disposed between the first grid 106 and the anode 112, wherein the second grid 108 is a mesh grid.

Some embodiments include an x-ray source, comprising: an anode 112; a field emitter 104 configured to generate an electron beam 140; a first grid 106 configured to control field emission from the field emitter 104; a second grid 108 disposed between the first grid 106 and the anode 112; and a middle electrode disposed between the first grid and the anode wherein the second grid is either disposed between the first grid and middle electrode or between the middle electrode and the anode In some embodiments, the field emitter 104 is one of a plurality of separate field emitters 104 disposed in a vacuum enclosure 114.

In some embodiments, the field emitter 104 comprises a nanotube field emitter 104.

In some embodiments, the x-ray source further comprises a spacer disposed between the first grid 106 and the anode 112; wherein the second grid 108 comprises a mesh grid disposed on the spacer 152*m*.

In some embodiments, the x-ray source further comprises a voltage source 118 configured to apply a first voltage to the first grid 106 and a second voltage to the second grid 108.

In some embodiments, the first voltage and the second voltage are the same.

In some embodiments, the first voltage and the second voltage are the ground.

In some embodiments, the first voltage and the second voltage are different.

In some embodiments, the voltage source 118 is a variable voltage source; and the variable voltage source is configured to vary at least one of the first voltage and the second voltage.

In some embodiments, the x-ray source further comprises a third grid 108-2 disposed between the first grid 106 and the anode 112 and disposed at the same distance from the field emitter 104 as the second grid 108-1; wherein the voltage source is configured to apply a third voltage to the third grid 108-2 and the third voltage is different from the second voltage.

In some embodiments, the x-ray source further comprises a third grid 108-2 disposed between the first grid 106 and the anode 112 and disposed at the same distance from the field emitter 104 as the second grid 108-1; wherein the voltage source is configured to apply a third voltage to the third grid 108-2 and the voltage source is configured to independently apply the third voltage and the second voltage.

In some embodiments, the x-ray source further comprises a spacer disposed between the first grid 106 and the anode 112; a third grid disposed between the first grid 106 and the anode 112; wherein the second grid 108-1 and the third grid 108-2 are disposed on the spacer 156.

In some embodiments, the spacer 156 comprises an opening; the second grid 108-1 is disposed along a first edge of the opening and the third grid 108-2 is disposed along a second edge of the opening opposite the first edge.

In some embodiments, the spacer 156 comprises a plurality of openings; the field emitter 104 is one of a plurality of field emitters 104, each field emitter 104 being aligned to a corresponding one of the openings; and for each of the openings, the second grid 108-1 is disposed along a first edge of the opening and the third grid 108-2 is disposed along a second edge of the opening opposite the first edge.

In some embodiments, the x-ray source further comprises a fourth grid 108-3 disposed between the first grid 106 and the anode 112; a fifth grid 108-4 disposed between the first grid 106 and the anode 112; wherein for each of the openings, the fourth grid 108-3 is disposed along a third edge of the opening that is orthogonal to the first edge and the fifth grid 108-4 is disposed along a fourth edge of the opening opposite the third edge.

In some embodiments, the x-ray source further comprises a middle electrode 110 disposed between the first grid 106 and the anode 112.

In some embodiments, the second grid 108 is disposed between the middle electrode 110 and the anode 112.

In some embodiments, the second grid 108 is disposed between the focusing electrode and the first grid 106.

In some embodiments, a distance between the field emitter 104 and the first grid 106 is less than 300 micrometers (μm) and a distance between the first grid 106 and the second grid 108 is greater than 1 millimeter (mm).

In some embodiments, the x-ray source further comprises a third grid 108-2 disposed between the second grid 108-1 and the anode 112.

In some embodiments, each of the first 106 and second grids 108 include a single row of openings.

In some embodiments, at least one of the first 106 and second grids 108 includes multiple rows with each row including multiple openings.

In some embodiments, the second grid 108 is an aperture.

In some embodiments, openings of the first grid 106 are laterally offset from openings of the second grid 108.

In some embodiments, openings of the first grid 106 have a different width than openings of the second grid 108.

Some embodiments include an x-ray source, comprising: a vacuum enclosure 114; an anode 112 disposed in the vacuum enclosure 114; a plurality of field emitters 104 disposed in the vacuum enclosure 114, each field emitter 104 configured to generate an electron beam 140; a plurality of first grids 106, each first grid 106 associated with a corresponding one of the field emitters 104 and configured to control field emission from the corresponding field emitter 104; and a second grid 108 disposed between the first grids 106 and the anode 112.

In some embodiments, the second grid 108 comprises a plurality of second grids 108, each second grid 108 associated with a corresponding one of the first grids 106 and disposed between the corresponding first grid 106 and the anode 112.

In some embodiments, the x-ray source further comprises a voltage source configured to apply voltages to the first grids 106 and the second grids 108 In some embodiments, the x-ray source further comprises a focusing electrode separate from the second grid 108 disposed between the field emitters 104 and the anode 112.

Some embodiments include an x-ray source, comprising: means for emitting electrons from a field; means for controlling the emissions of electrons from the means for emitting electrons from the field; means for generating x-rays in response to incident electrons; and means for altering an electric field at multiple locations between the means for controlling the emissions of electrons from the means for emitting electrons from the field and the means for generating x-rays in response to the incident electrons.

Examples of the means for emitting electrons from a field include the field emitter 104. Examples of the means for controlling the emissions of electrons from the means for emitting electrons from the field include the first grids 106. Examples of the means for generating x-rays in response to incident electrons include the anodes 112. Examples of the means for altering an electric field at multiple locations between the means for controlling the emissions of electrons from the means for emitting electrons from the field and the means for generating x-rays in response to the incident electrons include a second grid 108 and a middle electrode 110.

In some embodiments, the means for emitting electrons from the field is one of a plurality of means for emitting electrons from a corresponding field; and the means for altering the electric field comprises means for altering the electric field over each of the plurality of means for emitting electrons from a corresponding field.

In some embodiments, the means for altering the electric field comprises means for altering the electric field at multiple locations across the means for emitting electrons. Examples of the means for altering the electric field comprises means for altering the electric field at multiple locations across the means for emitting electrons include a second grid 108 and a middle electrode 110.

In some embodiments, the x-ray source further comprises means for altering an electric field between the means for controlling the emissions of electrons from the means for emitting electrons from the field and the means for generating x-rays in response to the incident electrons. Examples of the means for altering an electric field between the means for controlling the emissions of electrons from the means for emitting electrons from the field and the means for generating x-rays in response to the incident electrons include the second grids 108.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An x-ray source, comprising:
an anode;
a field emitter configured to generate an electron beam;
a first grid configured to control field emission from the field emitter;
a second grid disposed between the first grid and the anode;
a third grid disposed between the first grid and the anode; and
a middle electrode disposed between the first grid and the anode wherein the second grid is either disposed between the first grid and middle electrode or between the middle electrode and the anode;
wherein the third grid is a mesh grid.

2. The x-ray source of claim 1, wherein the field emitter is one of a plurality of separate field emitters disposed in a vacuum enclosure.

3. The x-ray source of claim 1, further comprising:
a spacer disposed between the first grid and the anode;
wherein the second grid is disposed on the spacer.

4. The x-ray source of claim 1, further comprising:
a voltage source configured to apply a first voltage to the first grid and a second voltage to the second grid.

5. The x-ray source of claim 4, wherein:
the first voltage and the second voltage are the same;
at least one of the first voltage and the second voltage is ground;
the first voltage and the second voltage are different; or
the voltage source is a variable voltage source and the variable voltage source is configured to vary at least one of the first voltage and the second voltage.

6. The x-ray source of claim 4, wherein:
the third grid is disposed at the same distance from the field emitter as the second grid;
wherein the voltage source is configured to apply a third voltage to the third grid and the voltage source is configured to independently apply the third voltage and the second voltage.

7. The x-ray source of claim 4, further comprising:
a spacer disposed between the first grid and the anode;
wherein the second grid and the third grid are disposed on the spacer.

8. The x-ray source of claim 7, wherein:
the spacer comprises a plurality of openings;
the field emitter is one of a plurality of field emitters, each field emitter being aligned to a corresponding one of the openings; and
for each of the openings, the second grid is disposed along a first edge of the opening and the third grid is disposed along a second edge of the opening opposite the first edge.

9. The x-ray source of claim 8, further comprising:
a fourth grid disposed between the first grid and the anode;
a fifth grid disposed between the first grid and the anode;
wherein for each of the openings, the fourth grid is disposed along a third edge of the opening that is orthogonal to the first edge and the fifth grid is disposed along a fourth edge of the opening opposite the third edge.

10. The x-ray source of claim 1, wherein the second grid is a mesh grid.

11. The x-ray source of claim 1, wherein a distance between the field emitter and the first grid is less than 300 micrometers (um) and a distance between the first grid and the second grid is greater than 1 millimeter (mm).

12. The x-ray source of claim 1, wherein the third grid is disposed between the second grid and the anode.

13. The x-ray source of claim 1, wherein each of the first and second grids include a single row of openings.

14. The x-ray source of claim 13, wherein openings of the first grid are laterally offset from openings of the second grid.

15. The x-ray source of claim 13, wherein openings of the first grid have a different width than openings of the second grid.

16. An x-ray source, comprising:
a vacuum enclosure;
an anode disposed in the vacuum enclosure;
a plurality of field emitters disposed in the vacuum enclosure, each field emitter configured to generate an electron beam;
a plurality of first grids, each first grid associated with a corresponding one of the field emitters and configured to control field emission from the corresponding field emitter; and
a second grid disposed between the first grids and the anode
a third grid disposed between the first grids and the anode; and
a middle electrode disposed between the first grids and the anode wherein the second grid is either disposed between the first grids and middle electrode or between the middle electrode and the anode;
wherein the third grid is a mesh grid.

17. The x-ray source of claim 16, wherein:
the second grid comprises a plurality of second grids, each second grid associated with a corresponding one of the first grids and disposed between the corresponding first grid and the anode.

18. An x-ray source, comprising:
a field emitter for emitting electrons from a field;
a first grid for controlling the emissions of electrons from the field emitter;
an anode for generating x-rays in response to incident electrons; and
a first mesh grid and second grid for altering an electric field at multiple locations between the first grid and the anode;
wherein the first mesh grid is at a first location of the multiple locations and the second grid is at a second location of the multiple locations.

19. The x-ray source of claim 18, wherein:
the field emitter is one of a plurality of field emitters; and
the first mesh grid and the second grid are configured for altering the electric field over each of the plurality of field emitters.

20. The x-ray source of claim 18, further comprising a second mesh grid or a third grid for altering an electric field between the first grid and the anode.

* * * * *